(12) United States Patent
Delaporte et al.

(10) Patent No.: US 12,155,086 B2
(45) Date of Patent: Nov. 26, 2024

(54) CELLULOSE-BASED SEPARATORS COMPRISING FLAME RETARDANT, AND USES THEREOF IN ELECTROCHEMISTRY

(71) Applicant: HYDRO-QUÉBEC, Québec (CA)

(72) Inventors: Nicolas Delaporte, Québec (CA); Alexis Perea, Québec (CA); Karim Zaghib, Québec (CA)

(73) Assignee: HYDRO-QUÉBEC, Montréal (CA)

( * ) Notice: Subject to any disclaimer, the term of this patent is extended or adjusted under 35 U.S.C. 154(b) by 570 days.

(21) Appl. No.: 17/424,916

(22) PCT Filed: Feb. 14, 2020

(86) PCT No.: PCT/CA2020/050193
§ 371 (c)(1),
(2) Date: Jul. 22, 2021

(87) PCT Pub. No.: WO2020/163960
PCT Pub. Date: Aug. 20, 2020

(65) Prior Publication Data
US 2022/0109214 A1 Apr. 7, 2022

(30) Foreign Application Priority Data
Feb. 15, 2019 (CA) ........................... 3033917

(51) Int. Cl.
*H01M 50/429* (2021.01)
*C09K 21/12* (2006.01)
(Continued)

(52) U.S. Cl.
CPC ......... *H01M 50/4295* (2021.01); *C09K 21/12* (2013.01); *H01M 4/587* (2013.01);
(Continued)

(58) Field of Classification Search
None
See application file for complete search history.

(56) References Cited

U.S. PATENT DOCUMENTS

2003/0166757 A1* 9/2003 Nishihara ................ C08K 9/08
523/210
2006/0276595 A1 12/2006 Baran et al.
(Continued)

FOREIGN PATENT DOCUMENTS

| CA | 2826264 A1 | 8/2012 |
| CN | 101089122 A | 12/2007 |

(Continued)

OTHER PUBLICATIONS

Extended European Search Report dated Feb. 21, 2023, issued by the European Patent Office in corresponding European Application No. 20755242.3-1108, (29 pages).
(Continued)

*Primary Examiner* — Scott J. Chmielecki
(74) *Attorney, Agent, or Firm* — Womble Bond Dickinson (US) LLP

(57) ABSTRACT

The present technology relates to a flame retardant, a cellulose fiber separator containing the flame retardant, a component comprising the separator and an electrolyte, and electrochemical cells and batteries comprising same as well as the uses thereof.

43 Claims, 25 Drawing Sheets

(51) Int. Cl.

| | |
|---|---|
| *H01M 4/02* | (2006.01) |
| *H01M 4/587* | (2010.01) |
| *H01M 4/62* | (2006.01) |
| *H01M 10/0525* | (2010.01) |
| *H01M 10/0568* | (2010.01) |
| *H01M 10/0569* | (2010.01) |
| *H01M 50/44* | (2021.01) |
| *H01M 50/443* | (2021.01) |
| *H01M 50/446* | (2021.01) |
| *H01M 50/451* | (2021.01) |
| *H01M 50/454* | (2021.01) |

(52) U.S. Cl.
CPC ....... *H01M 4/622* (2013.01); *H01M 10/0525* (2013.01); *H01M 10/0568* (2013.01); *H01M 10/0569* (2013.01); *H01M 50/44* (2021.01); *H01M 50/443* (2021.01); *H01M 50/446* (2021.01); *H01M 50/451* (2021.01); *H01M 50/454* (2021.01); *H01M 2004/027* (2013.01); *H01M 2300/0037* (2013.01)

(56) References Cited

U.S. PATENT DOCUMENTS

| | | | |
|---|---|---|---|
| 2007/0221891 | A1 | 9/2007 | Iio et al. |
| 2013/0302702 | A1 | 11/2013 | Matsumoto |
| 2013/0330637 | A1 | 12/2013 | Kazuaki et al. |
| 2016/0156008 | A1* | 6/2016 | Hirano ............ H01M 50/4295 429/246 |
| 2018/0145299 | A1* | 5/2018 | Iwamuro ............ H01M 50/429 |
| 2018/0294458 | A1* | 10/2018 | Ko ...................... H01M 50/417 |
| 2020/0048839 | A1 | 2/2020 | Oishi et al. |
| 2021/0040680 | A1* | 2/2021 | Matsumoto ............ D21H 15/12 |

FOREIGN PATENT DOCUMENTS

| | | |
|---|---|---|
| CN | 101124272 A | 2/2008 |
| CN | 101148526 A | 3/2008 |
| CN | 101233183 A | 7/2008 |
| CN | 102856522 A | 1/2013 |
| CN | 103459510 A | 12/2013 |
| CN | 103579562 A | 2/2014 |
| CN | 104752658 A | 7/2015 |
| CN | 108912445 A | 11/2018 |
| JP | 10-223196 | 8/1998 |
| JP | 2005019234 A | 1/2005 |
| JP | 2012-12734 | 1/2012 |
| JP | 2017-66578 | 4/2017 |
| WO | 2012/115092 | 7/2014 |
| WO | 2018/000295 A1 | 1/2018 |
| WO | 2018/151050 | 8/2018 |

OTHER PUBLICATIONS

Vilela, C. et al. "Nanocellulose/poly(methacryloyloxyethyl phosphate) composites as proton separator materials" Cellulose, (2016), vol. 23, pp. 3677-3689.

First Office Action dated Dec. 27, 2021, issued in the corresponding Chinese Patent Application No. 202080013926.8, 24 pages including 10 pages of English Translation.

Partial Supplementary European Search Report (Communication pursuant to Rule 164(1) EPC) dated Oct. 13, 2022, issued by the European Patent Office in corresponding European Application No. 20755242.3-1108, (23 pages).

Ding, G., et al., "A Polyborate Coated Cellulose Composite Separator for High Performance Lithium Ion Batteries", Journal of the Electrochemical Society, Feb. 24, 2015, pp A834-A838, vol. 162, No. 6. (5 pages).

International Search Report (PCT/ISA/210) with translation and Written Opinion (PCT/ISA/237) mailed on Jun. 11, 2020, by the Office de la propriété intellectuelle du Canada as the International Searching Authority for International Application No. PCT/CA2020/050193. (19 pages).

Zhang, J., et al., "Sustainable, heat-resistant and flame-retardant cellulose-based composite separator for high-performance lithium ion battery", Scientific Report, Feb. 3, 2014, pp. 1-8, vol. 4, 3935. (8 pages).

Sun, J. et al. "Novel Fiber Material" Shanghai: Shanghai University Press, p. 714, Aug. 2007, 6 pages.

Kordesch, K. V. "Batteries" Manganese Dioxide, vol. 1, Light Industry Press, p. 289, Feb. 1981, 5 pages.

Encyclopedia of Chemical Industry, vol. 4, Luminescent Materials—Fluorine, Editorial Board of Encyclopedia of Chemical Industry, Beijing: Chemical Industry Press, p. 248, Sep. 1993, 7 pages.

Yao, L. "Acrylate and Polymers Thereof", Beijing: Chemical Industry Press, p. 116, Mar. 1985, 5 pages.

Huang, L. "Polymer Composite Materials", Beijing: China Light Industry Press, p. 321, Jan. 2012, 6 pages.

Bian, J. et al. "Basics of Polymer Blending Modification", Chengdu: Southwest Jiaotong University Press, p. 233, Mar. 2018, 6 pages.

Xiao, J. Basics of Pure Electric Vehicles, Wuhan: Hubei Science and Technology Publishing House, p. 104, Apr. 2018, 6 pages.

Office Action (Rejection Decision) issued on Aug. 9, 2022, by the Chinese Patent Office in corresponding Chinese Patent Application No. 202080013926.8, and an English Translation of the Office Action. (12 pages).

Office Action in Japanese Application No. 2021-547081, mailing date Feb. 22, 2024.

Abada, S. et al. "Safety focused modeling of lithium-ion batteries: A review" J. Power Sources, 2016, vol. 306, pp. 178-192.

Ruiz, V. et al. "A review of international abuse testing standards and regulations for lithium ion batteries in electric and hybrid electric vehicles" Renewable and Sustainable Energy Reviews, 2018, vol. 81, pp. 1427-1452.

Li, C. et al. "Cathode materials modified by surface coating for lithium ion batteries" Electrochim. Acta, 2006, vol. 51, pp. 3872-3883.

Doughty, H. D. et al. "Effects of additives on thermal stability of Li ion cells" J. Power Sources, 2005, vol. 146, pp. 116-120.

Granzow, A. "Flame Retardation by Phosphorus CompoundsAccounts of Chemical Research", 1978, vol. 11, pp. 177-183.

Yao, X. L. et al. "Comparative study of trimethyl phosphite and trimethyl phosphate aselectrolyte additives in lithium ion batteries" J. Power Sources, 2005, vol. 144, pp. 170-175.

Shi, C. et al. Functional separator consisted of polyimide nonwoven fabrics and polyethylene coating layer for lithium-ion batteriesJ. Power Sources, 2015, vol. 298, pp. 158-165.

Liu, K. et al. "Electrospun core-shell microfiber separator with thermal-triggered flame-retardant properties for lithium-ion batteries" Science Advances, 2017, vol. 3, 9 pages.

Jabbour, L. et al. "Cellulose-based Li-ion batteries: a review" Cellulose, 2013, vol. 20, pp. 1523-1545.

Kemmlein, S. et al. "Brominated flame retardants in the European chemicals policy of REACH—Regulation and determination in materials" J. Chromatogr. A, 2009, vol. 1216, pp. 320-333.

Bélanger, D. et al. "Electrografting: a powerful method for surface modification" J. Pinson, Chem. Soc. Rev., 2011, vol. 40, pp. 3995-4048.

Sonnier, R. et al. "Improving the flame retardancy of flax fabrics by radiation grafting of phosphorus compounds" Eur. Polym. J., 2015, vol. 68, pp. 313-325.

Haj, R. et al. "Grafting of phosphorus flame retardants on flax fabrics: Comparison between two routes" Polym. Deg. Stab., 2018, vol. 147, pp. 25-34.

Sheng, O. et al. "Mg2B2O5 Nanowire Enabled Multifunctional Solid-State Electrolytes with High Ionic Conductivity, Excellent Mechanical Properties, and Flame-Retardant Performance" Nano Lett., 2018, vol. 18, pp. 3104-3112.

Li, S. et al. "A new route for the synthesis of Mg2B2O5 nanorods by mechano-chemical and sintering process" Mater. Lett., 2010, vol. 64, pp. 151-153.

Doppelt, P. et al. "Surface Modification of Conducting Substrates. Existence of Azo Bonds in the Structure of Organic Layers Obtained from Diazonium", Chem. Mater., 2007, vol. 19, pp. 4570-4575.

(56) References Cited

OTHER PUBLICATIONS

Ouyang, D. et al."Investigation into the Fire Hazards of Lithium-Ion Batteries under Overcharging" Appl. Sci., 2017, vol. 7, 20 pages.

* cited by examiner

Scheme 2

CELLULOSE-BASED SEPARATORS COMPRISING FLAME RETARDANT, AND USES THEREOF IN ELECTROCHEMISTRY

RELATED APPLICATION

This application claims priority, under the applicable law, to Canadian Patent Application No. 3,033,917 filed on Feb. 15, 2019, the content of which is incorporated herein by reference in its entirety and for all purposes.

TECHNICAL FIELD

The present application relates to the field of separators used in electrochemistry, particularly to separators having flame-retardant or heat-resistant properties.

BACKGROUND

Today, Li-ion batteries are widely used commercially for applications such as automobiles, mobile phones or stationary energy storage. One of the major lines of research in the development of Li-ion batteries focusses on their safety. Understanding the phenomena associated with thermal runaway as well as the means to prevent this reaction are key to the development of Li-ion batteries on a large scale (S. Abada, et al., *J. Power Sources*, 2016, 306, 178-192). Indeed, it has been shown that abusive conditions of use of a battery may lead to its thermal runaway. Such conditions can be encountered, for example, in a collision of an electric vehicle or when a battery is overheated, short-circuited, or overcharged (V. Ruiz, A. Pfrang, et al., *Renewable and Sustainable Energy Reviews*, 2018, 81, 1427-1452). The main consequences of thermal runaway include battery ignition as well as the release of toxic fumes from electrolyte combustion. Various strategies intrinsic to the battery have been developed in order to limit or eliminate the effects of thermal runaway, such as the modification of the cathode and anode materials, the addition of additives to the electrolyte and the use of separators having improved thermal stability. Modifying the surface of electrode materials may also allow to protect particles in contact with the electrolyte and thus limit certain side reactions. Various oxides such as $Li_2CO_3$, $SiO_2$ or $SnO_2$ can be used (C. Li, H. P. Zhang, L. J. Fu, H. Liu, Y. P. Wu, E. Rahm, R. Holze, H. Q. Wu, *Electrochim. Acta*, 2006, 51, 3872-3883).

The addition of fireproof (flame retardant) type additives to electrolytes was the subject of investigations by various groups (for instance, see Doughty, D. H. et al., 2005, *J. Power Source*, 146, 116-120). These additives could reduce the risk of battery fire during a thermal runaway. The mechanism of action of these flame retardant additives lies mainly in the chemical trapping of H• or OH• free radicals released during battery combustion (A. Granzow, *Acc. of Chem. Res.*, 1978, 11, 177-183). Phosphate-based flame retardant additives are the most used and improve the thermal stability of the battery. However, these additives must be added in very low concentration, since their reduction of the flammability of electrolytes is accompanied by a reduction in performance, caused in part by the high viscosity of the additive-containing electrolyte (X. L. Yao, et al., *J. Power Sources*, 2005, 144, 170-175).

The thermal stability of the battery separator also plays a very important role in the thermal runaway reaction. Indeed, during the melting of the separator, a short circuit occurs, thus increasing the risk of chain reactions. Different strategies have been adopted to increase its stability, such as replacing the separator traditionally made of polyethylene or polypropylene with polyimide. However, the synthetic method for this type of polymer is difficult to apply on an industrial scale (C. Shi, et al., *J. Power Sources*, 2015, 298, 158-165). It has been shown that it was also possible to incorporate a flame retardant additive into a polymeric separator (see K. Liu, et al., *Science Advances*, 2017, 3, e1601978, 1-8). However, in order for the flame retardant present in the polymer to be released, the separator must have melted, then involving an additional short-circuit risk.

There is therefore a need for new methods of incorporating a flame retardant into a battery and/or new separators which do not include at least one of the disadvantages of current separators.

SUMMARY

According to a first aspect, the present document relates to a separator for an electrochemical cell comprising cellulose fibers, modified or not, and a flame retardant.

According to one embodiment, the cellulose fibers comprise natural cellulose fibers, modified cellulose fibers or a combination. For example, the cellulose is natural. The cellulose may also be a modified cellulose, for instance comprising hydrophilic groups or, alternatively, hydrophobic groups.

According to an embodiment, the average size of the cellulose fibers is between 5 nm and 5 mm, or between 500 nm and 3 mm, or between 1 μm and 3 mm, between 100 μm and 3 mm, or between 250 μm and 3 mm. According to an example, the average size of the cellulose fibers is between 750 μm and 2.5 mm, or between 1 mm and 2.5 mm, or between 0.5 mm and 3 mm, or again between 1 mm and 3 mm. According to another example, the average size of the cellulose fibers is between 5 nm and 500 μm, or between 50 nm and 100 μm, or between 250 nm and 50 μm, or between 250 nm and 10 μm.

According to another embodiment, the separator is as defined above and the flame retardant comprises a halogenated organic group, a halogenated polymeric chain, an organophosphorus group, a phosphorus-containing polymeric chain, a nitrogen-containing organic group, a nitrogen-containing polymeric chain, an inorganic compound, or one of their combinations.

For example, the flame retardant can be trapped inside the cellulose fibers and/or attached to the cellulose fibers by electrostatic intermolecular interactions and/or by hydrogen bonds. In one embodiment, the flame retardant is an inorganic compound, for example, a metal (such as Mg, Sb, Al, Zn, Ca, and others) complex oxide, oxide, hydroxide, silicate, borate or phosphate, for instance an alkali or alkaline earth metal borate (such as $Na_2O \cdot 2B_2O_3$, $xMgO \cdot yB_2O_3 \cdot zH_2O$, $Mg_2B_2O_5$, etc.) or a transition metal borate (like a Zn, Al, Ag, Fe, Cu, Ni, Sr, Pb, or Zr borate). According to one embodiment, the flame retardant is in the form of particles.

According to another embodiment, the flame retardant is attached to the cellulose fibers by one or more covalent bonds. Alternatively, the flame retardant is fixed on a support by one or more covalent bonds, the support being integrated into the porosity of the cellulose fibers and/or fixed on the cellulose fibers by electrostatic intermolecular interactions and/or by hydrogen bonds. For example, the support is in the form of particles formed from an electrochemically inert and electronically non-conductive material. The electrochemically inert material is selected from an inorganic compound (such as a metallic or non-metallic oxide or a ceramic) or a polymer, preferably the electrochemically inert material is an ionic conductor. For example, the electrochemically inert material comprises an inorganic compound (such as $Al_2O_3$, $ZrO_2$, $Cr_2O_3$, $TiO_2$, $CeO_2$, $Fe_2O_3$, $B_2O$, or $SiO_2$).

According to the previous embodiment, the flame retardant is selected from a halogenated organic group, a halogenated polymeric chain, an organophosphorus group, a phosphorus-containing polymeric chain, a nitrogen-containing organic group, or a nitrogen-containing polymeric chain. According to one example, the flame retardant is a halogenated organic group selected from aryl groups substituted with chlorine and/or bromine atoms (such as 2,5-dichlorophenyl, 2,4,6-tribromophenyl, etc.). According to another example, the flame retardant is an organophosphorus group or a phosphorus-containing polymeric chain, preferably comprising a phosphate or phosphonate ester group linked to the cellulose fibers or to the support by a group selected from alkylene, alkenylene, arylene, ether, ester, carbonate, carbamate, amine, amide, diazonium, triazene, silane, and a combination of at least two thereof.

According to an embodiment, the organophosphorus group or phosphorus-containing polymeric chain is of Formula I:

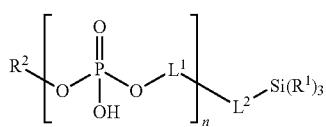

Formula I wherein,
- $L^1$ is, independently at each occurrence, selected from alkylene, alkyleneoxycarbonylalkylene, and alkylenecarbonyloxyalkylene;
- $L^2$ is selected from an alkylene, alkyleneoxy (linked to the silicon atom by an oxygen atom), oxyalkylene (linked to the silicon atom by a carbon atom), oxyalkyleneoxy, alkyleneoxycarbonylalkylene, alkylenecarbonyloxyalkylene, oxyalkyleneoxycarbonylalkylene, and oxyalkylenecarbonyloxyalkylene;
- $R^1$ is, independently at each occurrence, a OH, Cl, $C_{1-6}$alkyl, $OC_{1-6}$alkyl group, or a covalent bond between the silicon atom and the oxygen atom from the support or from the cellulose fiber, and where at least one $R^1$ is such a covalent bond;
- $R^2$ is H, $C_{1-6}$alkyle, or a $-L^1-L^2-Si(R^1)_3$ group; and
- n is an integer selected from the numbers 1 to 2000, for example, from 1 to 1000, or from 1 to 500, or from 1 to 100, or from 1 to 50, or from 1 to 10.

According to one example, the organophosphorus group or phosphorus-containing polymeric chain is of Formula II:

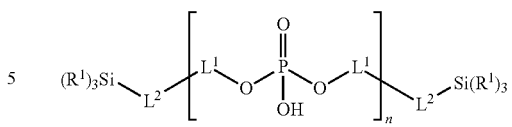

Formula II wherein $L^1$, $L^2$, $R^1$ and n are as defined above.

According to one embodiment, the alkylene included in the $L^1$ alkylene, alkyleneoxycarbonylalkylene, or alkylenecarbonyloxyalkylene groups of Formulae I and II comprises from 1 to 4 carbon atoms, or from 2 to 4 carbon atoms, or alternatively 2 or 3 carbon atoms.

According to another embodiment, the alkylene included in the $L^2$ alkylene, alkyleneoxy, oxyalkylene, oxyalkyleneoxy, alkyleneoxycarbonylalkylene, alkylenecarbonyloxyalkylene, oxyalkyleneoxycarbonylalkylene, or oxyalkylenecarbonyloxyalkylene groups of Formulae I and II comprises from 1 to 4 carbon atoms, or from 2 to 4 carbon atoms, or alternatively 2 or 3 carbon atoms.

According to another example, the organophosphorus group or phosphorus-containing polymeric chain is of Formula III:

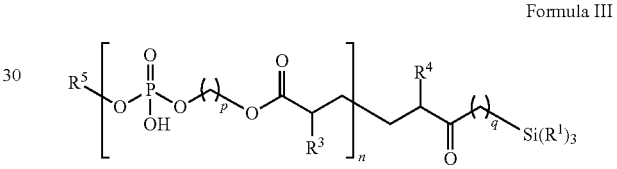

Formula III wherein,
- $R^1$ and n are as defined above;
- $R^3$ and $R^4$ are, independently at each occurrence, a hydrogen atom or a $C_{1-3}$alkyl group;
- $R^5$ is H, $C_{1-6}$alkyl, or a $-(CH_2)_pOC(O)CH(R^3)CH_2CH_2CH(R^4)(CH_2)_q-Si(R^1)_3$ group;
- p is an integer independently at each occurrence selected from the numbers 2 to 4; and
- q is an integer independently at each occurrence selected from the numbers 1 to 4.

According to yet another example, the organophosphorus group or phosphorus-containing polymeric chain is of Formula IV:

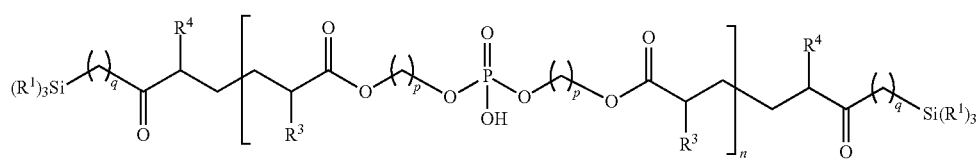

Formula IV wherein $R^1$, $R^3$, $R^4$, n, p and q are as defined above.

In one embodiment of Formulae III and IV, p is an integer selected from the numbers 2 and 3, preferably 2. In another embodiment of Formulae III and IV, q is an integer selected from the numbers 2 to 4, preferably 2 or 3.

In one embodiment of Formulae III and IV, $R^3$ is a hydrogen or a methyl, preferably a methyl. In another embodiment of Formulae III and IV, $R^4$ is a hydrogen or a methyl, preferably a methyl.

According to one embodiment of Formulae I to IV, $R^1$ is a covalent bond between the silicon atom and the oxygen atom of the support in at least one occurrence. According to another embodiment of Formulae I to IV, $R^1$ is a covalent bond with the support or the cellulose fiber in at least three occurrences, for example, a covalent bond with the support in at least three occurrences. For example, $R^1$ may be a covalent bond with the support or the cellulose fiber in each occurrence, or a covalent bond with the support in each occurrence.

According to another aspect, this document describes a separator-electrolyte component comprising a separator as defined herein and an electrolyte comprising at least one element selected from a salt, a polar, aprotic and non-aqueous solvent, an ionic liquid, and a polymer.

In an embodiment, the separator-electrolyte component comprises a polar, aprotic and non-aqueous solvent, for example, selected from cyclic carbonates (ethylene carbonate (EC), propylene carbonate (PC), butylene carbonate (BC), vinylene carbonate (VC), and their derivatives); acyclic carbonates (dimethyl carbonate (DMC), diethyl carbonate (DEC), ethyl methyl carbonate (EMC), dipropyl carbonate (DPC), and their derivatives); lactones (γ-butyrolactone (γ-BL) and γ-valerolactone (γ-VL)); acyclic ethers (1,2-dimethoxyethane (DME), 1,2-diethoxyethane (DEE), ethoxymethoxyethane (EME), trimethoxymethane, etc.); cyclic ethers (tetrahydrofuran, 2-methyltetrahydrofuran, 1,3-dioxolane, and their derivatives); amides (formamide, acetamide, dimethylformamide), nitriles (acetonitrile, propylnitrile), nitromethane, phosphoric acid triester, dimethyl sulfoxide (DMSO), sulfolane, methylsulfolane, and mixtures thereof.

According to another embodiment, the separator-electrolyte component comprises a salt of an alkali or alkaline earth metal, for instance, a lithium salt, preferably selected from lithium hexafluorophosphate ($LiPF_6$), lithium bis(trifluoromethanesulfonyl)imide (LiTFSI), lithium bis(fluorosulfonyl)imide (LiFSI), lithium 2-trifluoromethyl-4,5-dicyanoimidazolate (LiTDI), lithium 4,5-dicyano-1,2,3-triazolate (LiDCTA), lithium bis(pentafluoroethylsulfonyl)imide (LiBETI), lithium tetrafluoroborate ($LiBF_4$), lithium bis(oxalato)borate (LiBOB), lithium nitrate ($LiNO_3$), lithium chloride (LiCl), lithium bromide lithium (LiBr), lithium fluoride (LiF), lithium perchlorate ($LiClO_4$), lithium hexafluoroarsenate ($LiAsF_6$), lithium trifluoromethanesulfonate ($LiSO_3CF_3$) (LiTf), lithium fluoroalkylphosphate $Li[PF_3(CF_2CF_3)_3]$ (LiFAP), lithium tetrakis(trifluoroacetoxy)borate $Li[B(OCOCF_3)_4]$(LiTFAB), lithium bis(1,2-benzenediolato(2-)-O,O')borate $Li[B(C_6O_2)_2]$ (LBBB), or a combination thereof.

According to another embodiment, the separator-electrolyte component comprises a polymer. According to yet another embodiment, the separator-electrolyte component comprises an ionic liquid.

According to another aspect, this document relates to an electrochemical cell comprising a negative electrode, a positive electrode, an electrolyte and a separator as defined herein.

Alternatively, this document relates to an electrochemical cell comprising a negative electrode, a positive electrode, and a separator-electrolyte component as defined herein.

According to one embodiment, the positive electrode comprises a positive electrode electrochemically active material, optionally a binder, and optionally an electronically conductive material. For example, the positive electrode electrochemically active material may be selected from metal phosphates, lithiated metal phosphates, metal oxides, and lithiated metal oxides.

According to another embodiment, the negative electrode comprises a negative electrode electrochemically active material, for example, selected from alkali and alkaline earth metals and alloys comprising them (for example, lithium, sodium, potassium), graphite and other carbon sources (porous carbon, carbon nanotubes, etc.), metal oxides and lithiated metal oxides (such as lithium titanate, vanadium oxide, lithiated vanadium oxide, etc.), and organic anode materials (such as tetra-lithium perylene-3,4,9,10-tetracarboxylate (PTCLi4), naphthalene-1,4,5,8-tetracarboxylic dianhydride (NTCDA), perylene-3,4,9,10-tetracarboxylic dianhydride (PTCDA), Tr-conjugated dicarboxylates, and anthraquinone).

The present document also describes an electrochemical accumulator comprising at least one electrochemical cell as defined in this document, for example, the electrochemical accumulator may be selected from a lithium or lithium-ion battery, a sodium or sodium-ion battery, a potassium or potassium-ion battery.

According to another aspect, the present document also relates to a material comprising a flame retardant covalently fixed on a support, the support being in the form of particles. For example, the particles are formed of an electrochemically inert and electronically non-conductive material. According to one embodiment, the electrochemically inert material is selected from an inorganic compound, a ceramic, and a polymer, preferably the electrochemically inert material is an ionic conductor. According to an example, the electrochemically inert material comprises an inorganic compound (such as $Al_2O_3$, $ZrO_2$, $Cr_2O_3$, $TiO_2$, $CeO_2$, $Fe_2O_3$, $B_2O$, or $SiO_2$).

According to one embodiment, the flame retardant is selected from a halogenated organic group, a halogenated polymeric chain, an organophosphorus group, a phosphorus-containing polymeric chain, a nitrogen-containing organic group, or a nitrogen-containing polymeric chain. According to one example, the flame retardant is a halogenated organic group selected from aryl groups substituted with chlorine and/or bromine atoms (such as 2,5-dichlorophenyl, 2,4,6-tribromophenyl, etc.). According to another example, the flame retardant is an organophosphorus group or a phosphorus-containing polymeric chain, for example, comprising a phosphate or phosphonate ester group linked to the support by a group selected from alkylene, alkenylene, arylene, ether, ester, carbonate, carbamate, amine, amide, diazonium, triazene, silane, or a combination of at least two thereof.

According to one embodiment of the material, the organophosphorus group or phosphorus-containing polymeric chain is of Formula I:

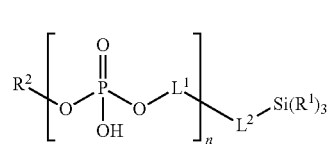

Formula I wherein,

L$^1$ is, independently at each occurrence, selected from alkylene, alkyleneoxycarbonylalkylene, and alkyleneocarbonyloxyalkylene;

L$^2$ is selected from an alkylene, alkyleneoxy (linked to the silicon atom by an oxygen atom), oxyalkylene (linked to the silicon atom by a carbon atom), oxyalkyleneoxy, alkyleneoxycarbonylalkylene, alkylenecarbonyloxyalkylene, oxyalkyleneoxycarbonylalkylene, and oxyalkylenecarbonyloxyalkylene;

$R^1$ is, independently at each occurrence, a OH, Cl, $C_{1-6}$alkyl, $OC_{1-6}$alkyl group, or a covalent bond between the silicon atom and the oxygen atom from the support, and where at least one $R^1$ is such a covalent bond;

$R^2$ is H, $C_{1-6}$alkyle, or a $-L^1-L^2-Si(R^1)_3$ group; and n is an integer selected from the numbers 1 to 2000, for example, from 1 to 1000, or from 1 to 500, or from 1 to 100, or from 1 to 50, or from 1 to 10.

According to an example of the material, the organophosphorus group or phosphorus-containing polymeric chain is of Formula II:

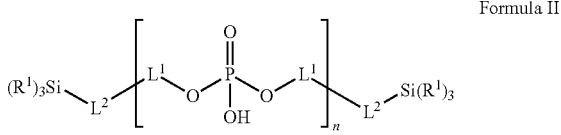

Formula II wherein $L^1$, $L^2$, $R^1$ and n are as defined above.

In Formulae I and II, the alkylene included in the $L^1$ alkylene, alkyleneoxycarbonylalkylene, or alkylenecarbonyloxyalkylene groups may comprise from 1 to 4 carbon atoms, or from 2 to 4 carbon atoms, or alternatively 2 or 3 carbon atoms.

Similarly, in Formulae I and II, the alkylene included in the $L^2$ alkylene, alkyleneoxy, oxyalkylene, oxyalkyleneoxy, alkyleneoxycarbonylalkylene, alkylenecarbonyloxyalkylene, oxyalkyleneoxycarbonylalkylene, or oxyalkylenecarbonyloxyalkylene groups may comprise from 1 to 4 carbon atoms, or from 2 to 4 carbon atoms, or alternatively 2 or 3 carbon atoms.

According to another example of the material, the organophosphorus group or phosphorous-containing polymeric chain is of Formula III:

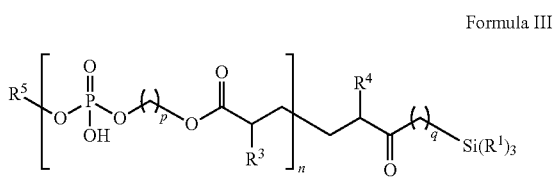

Formula III wherein, $R^1$ and n are as defined above;

$R^3$ and $R^4$ are, independently at each occurrence, a hydrogen atom or a $C_{1-3}$alkyl group;

$R^5$ is H, $C_{1-6}$alkyl, or a $-(CH_2)_pOC(O)CH(R^3)CH_2CH_2CH(R^4)(CH_2)_q-Si(R^1)_3$ group;

p is an integer independently at each occurrence selected from the numbers 2 to 4; and q is an integer independently at each occurrence selected from the numbers 1 to 4.

According to yet another example of the material, the organophosphorus group or phosphorus-containing polymeric chain is of Formula IV:

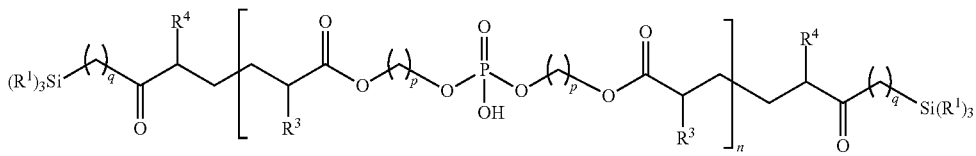

Formula IV wherein $R^1$, $R^3$, $R^4$, n, p and q are as defined above.

In one embodiment of Formulae III and IV, p is an integer selected from the numbers 2 and 3, preferably 2. In another embodiment of Formulae III and IV, q is an integer selected from the numbers 2 to 4, preferably 2 or 3.

In an embodiment of Formulae III and IV, $R^3$ is a hydrogen or a methyl, preferably a methyl.

In another embodiment of Formulae III and IV, $R^4$ is a hydrogen or a methyl, preferably a methyl.

According to an embodiment of Formulae I to IV of the material, $R^1$ is a covalent bond with the support in at least three occurrences. For example, $R^1$ may be a covalent bond with the support in each occurrence.

DETAILED DESCRIPTION

Figure 1:
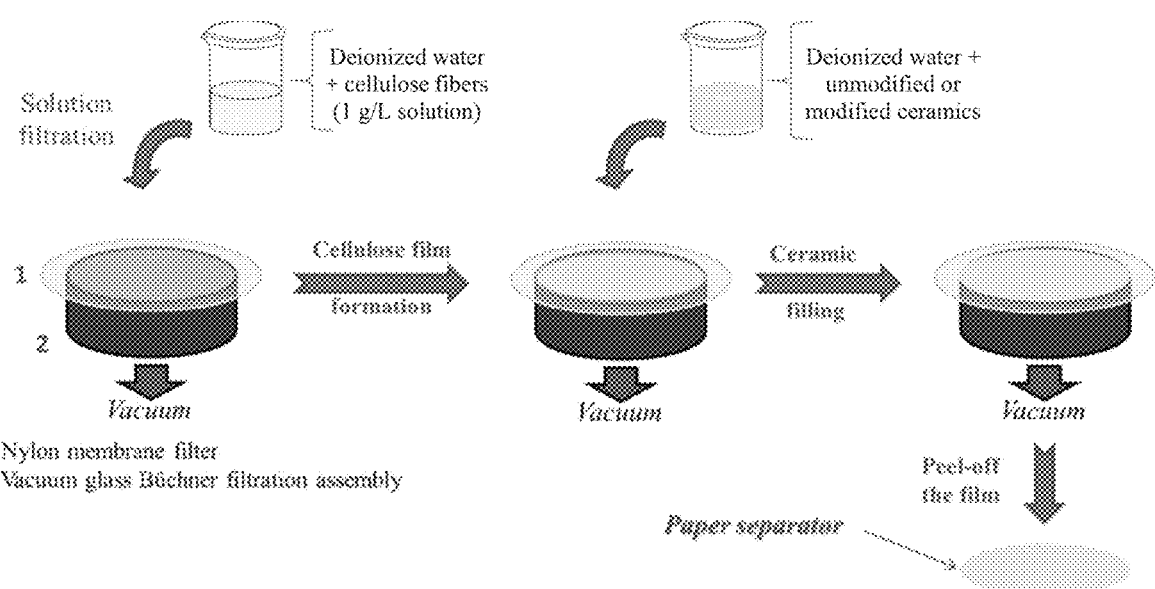
FIG. 1 schematically illustrates one embodiment of the manufacturing process as described herein.

All technical and scientific terms and expressions used herein have the same definitions as those commonly understood by the person skilled in the art relating to the present technology. The definition of some terms and expressions used is nevertheless provided below.

The term "about" as used herein means approximately, in the region of, and around. When the term "about" is used in relation to a numerical value, it modifies it, for example, above and below by a variation of 10% compared to the nominal value. This term can also take into account, for instance, the experimental error of a measuring device or rounding of a number.

When a range of values is mentioned in the present application, the lower and upper limits of the range are, unless otherwise indicated, always included in the definition.

The chemical structures described herein are drawn according to conventions in the field. Also, when an atom, such as a carbon atom, as drawn appears to include an incomplete valence, then the valence will be assumed to be satisfied by one or more hydrogen atoms even if they are not explicitly drawn.

As used herein, the term "alkyl" refers to saturated hydrocarbon groups having from 1 to 21 carbon atoms, including linear and branched alkyl groups. Non-limiting examples of alkyl groups may comprise methyl, ethyl, propyl, butyl, pentyl, hexyl, heptyl, octyl, nonyl, decyl, isopropyl, tert-butyl, sec-butyl, isobutyl and the like. Similarly, an "alkylene" group denotes an alkyl group located between two other groups. Examples of alkylene groups comprise methylene, ethylene, propylene, etc. Alkyl and alkylene groups may be unsubstituted or substituted with one or more substituents, for example, halogen (e.g., fluorine, chlorine), hydroxyl, alkoxyl, nitrile, etc. The terms "$C_1$-$C_n$alkyl" and "$C_1$-$C_n$alkylene" refer to an alkyl group having from 1 to the indicated "n" number of carbon atoms.

As used herein, the term "alkenyl" refers to unsaturated hydrocarbon groups comprising at least one double bond between two carbon atoms. Non-limiting examples of alkenyl groups comprise vinyl, allyl, prop-1-en-2-yl, but-1-en-3-yl, but-1-en-4-yl, but-2-en-4-yl, pent-1-en-5-yl, penta-1,3-dien-5-yl, etc. Similarly, an "alkenylene" group denotes an alkenyl group located between two other groups. Examples of alkenylene groups comprise vinylene (ethenylene), propenylene, etc. Alkenyl and alkenylene groups may be unsubstituted or substituted with one or more substituents, for example, halogen (e.g., fluorine, chlorine), hydroxyl, alkoxyl, nitrile, etc. The terms "$C_2$-$C_n$alkenyl" and "$C_2$-$C_n$alkenylene" refer to an alkenyl group having from 2 to the indicated "n" number of carbon atoms.

The expressions "electrochemically inert" or "not active electrochemically" as used herein relate to a property of a material according to which this material with not participate in an oxidation-reduction reaction of an electrochemical cell under the conditions specific to the electrode materials that it contains and to its use (normal charge/discharge conditions).

The expression "electronically non-conductive" as used herein refers to a material which does not significantly conduct electrons under the conditions of use. For example, the material is not a semiconductor or an electronic conductor and has a conductivity of 10-3 S/m or less.

Figure 7:
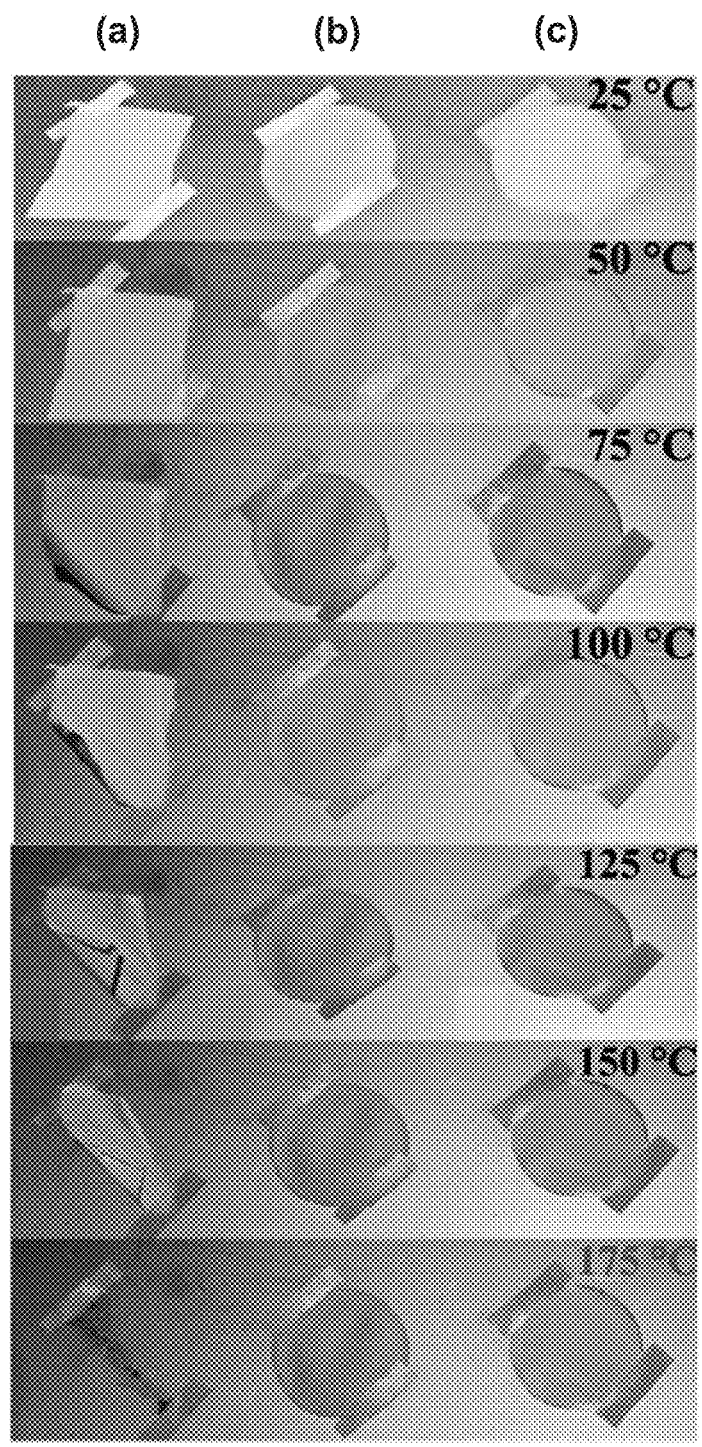
FIG. 7 shows the photographs of the separators (a) Celgard®-3501 (left), (b) cellulose (center), and (c) cellulose+$Mg_2B_2O_5$ (right) taken at temperatures of 25° C., 50° C., 75° C., 100° C., 125° C., 150° C., and 175° C.

In order to overcome the problems described above, it is proposed here, for example, to graft flame retardants (for example, based on halogen or phosphorus) on ceramics (here $Al_2O_3$) and to incorporate them in the porosity of cellulose separators which are much more thermally stable than polyethylene or polypropylene industrial separators (e.g., Celgard®-3501, see FIG. 7). Alternatively, a rod shape ceramic (for example, $Mg_2B_2O_5$) and having flame retardant properties is also proposed.

This document therefore presents a separator for an electrochemical cell comprising cellulose fibers and a flame retardant. Cellulose is formed of macromolecules mainly consisting of linear chains of D-glucose molecules comprising several hydroxyl groups. This biopolymer is the main constituent of the membrane of plant cells.

The cellulose fibers forming the present separator can comprise natural cellulose fibers, modified cellulose fibers or a combination of the two. These fibers may or may not be woven, preferably nonwoven.

Natural cellulose is generally of plant origin, for example, from trees or from another plant (such as cotton). Some filamentous fungi and some bacteria can also produce cellulose. Natural cellulose can also be untreated or be pretreated (e.g., bleached, treated with aluminum sulfate, etc.).

Modified cellulose comprises groups attached to the hydroxyls of these cellulose monomers. In other words, at least some of the —OH groups in cellulose become —OR, where R forms an ester, ether, phosphate or phosphonate ester, sulfate or sulfonate ester, carbonate, carbamate, etc. These groups may be of a hydrophilic nature, comprising for example carboxyl, hydroxyl or other groups, or hydrophobic, such as groups comprising alkyl chains, depending on the needs and the compatibility with the other elements of the electrochemical cell. Examples of modified celluloses include cellulose acetate, cellulose phthalate, and other cellulose esters, cyanomethylated cellulose, ethyl cellulose, hydroxypropyl or hydroxyethyl cellulose, celluloses modified with acrylic acid and/or polyvinyl alcohol, and other modified celluloses. It is understood that the modified celluloses which can be used in the present technology must allow the formation of a film made of cellulose fibers.

The average size of the cellulose fibers can be millimetric, micrometric or nanometric. For example, the average size may vary between 5 nm and 5 mm, or between 500 nm and 3 mm, or between 1 µm and 3 mm, between 100 µm and 3 mm, or between 250 µm and 3 mm. For instance, fibers of millimetric or high micrometric size can have an average size varying between 750 µm and 2.5 mm, or between 1 mm and 2.5 mm, or between 0.5 mm and 3 mm, or again between 1 mm and 3 mm. On the other hand, the average size of nanometric or low micrometric size may vary between 5 nm and 500 µm, or between 50 nm and 100 µm, or between 250 nm and 50 µm, or between 250 nm and 10 µm. The cellulose may also comprise a mixture of fibers of millimetric size and fibers of nanometric and/or micrometric size.

The flame retardant may be selected from halogenated organic compounds, halogenated polymers, organophosphorus compounds, phosphorus-containing polymers, nitrogen-containing compounds, nitrogen-containing polymers, and inorganic compounds having flame retardant properties. This retardant can be physically trapped inside of the fibers, linked to cellulose fibers by electrostatic or hydrogen bonding type interactions, and/or covalently bonded to the cellulose fibers. The flame retardant may also be covalently bound to a support, for example in particulate form, which can be simply physically mixed with the fibers, trapped within the fibers and/or bonded to the cellulose fibers by interactions of electrostatic or hydrogen bonding type.

A first type of flame retardant comprises inorganic compounds possessing this type of property and being electrochemically inert under the intended conditions of use. For example, the inorganic compound may be a metal (such as Mg, Sb, Al, Zn, Ca, and others) complex oxide, oxide, hydroxide, silicate, borate or phosphate not active electrochemically under the intended conditions of use and having flame retardant properties. The compound may also be generally based on boron, for example, based on boric acid or boric oxide. Examples of inorganic compounds based on boron comprise an alkali or alkaline earth metal borate, hydrated or not, for instance, $Na_2O \cdot 2B_2O_3$, $xMgO \cdot yB_2O_3 \cdot zH_2O$, $Mg_2B_2O_5$, etc. or borates of transition metals such as Zn, Al, Ag, Fe, Cu, Ni, Sr, Pb, Zr.

The inorganic compound will generally be in the form of particles (in any shape, including substantially round, rod, needle, sheet, etc.). The retardant is then at least partly trapped in the cellulose fibers and can also be attached to the fibers by more or less strong interactions of electrostatic or hydrogen bounding types.

A second type of flame retardant may be attached directly to the cellulose fibers by covalent bonds. The same type of retardant may also be covalently attached to a support, preferably in the form of particles, the support being electrochemically inert under the intended conditions of use. This support is also preferably ionically conducting or non-harmful to ionic conduction. This support is then, at least in part, trapped inside of the cellulose fiber network and/or attached to the cellulose fibers by electrostatic intermolecular interactions and/or by hydrogen bonds. The support may also simply be physically mixed with the cellulose fibers and be integrated into the porosity of the separator. The support can also be found in greater concentration on one side of the separator. The support material is generally an inorganic compound or a polymer. For example, the inorganic compound is a ceramic. Examples of inorganic compounds used as support include ceramics, metal ($Al_2O_3$, $ZrO_2$, $Cr_2O_3$, $TiO_2$, $CeO_2$, $Fe_2O_3$) and nonmetal (ex. $B_2O$, $SiO_2$) oxides. It is understood that the compound is not a semiconductor or an electronic conductor and is electrochemically inert under the intended conditions of use.

In this alternative, the function acting as a flame retardant is grafted onto the surface of the support or directly onto the cellulose. This function then comes from a halogenated organic group, a halogenated polymeric chain, an organophosphorus group, a phosphorus-containing polymeric chain, a nitrogen-containing organic group, or a nitrogen-containing polymeric chain. Examples of halogenated organic groups include aryl groups substituted with chlorine and/or bromine atoms (such as 2,5-dichlorophenyl, 2,4,6-tribromophenyl, etc.). A nitrogen-containing organic group or polymeric chain may comprise one or more melamine (2,4,6-triamino-1,3,5-triazine), hindered amine oxide, urea or guanidine function. An organophosphorus group or a phosphorus-containing polymeric chain may comprise a phosphate or phosphonate ester group attached to the cellulose fibers or to the support by a linker-type group such as an alkylene, alkenylene, arylene, ether, ester, carbonate, carbamate, amine, amide, diazonium, triazene, silane, each of which may be substituted, or a combination of at least two of these in the same group (e.g., a group combination —OC(O)alkyl-O-alkyl-, —Si(OR)$_2$—OC(O)alkyl-C(O)O-alkyl-). According to an example, the arylene group comes from a catechol group (ortho —O-phenyl-O—).

For example, the organophosphorus group or phosphorus-containing polymeric chain is of Formula I:

Formula I

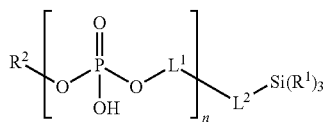

wherein,
L¹ is, independently at each occurrence; selected from alkylene, alkyleneoxycarbonylalkylene, and alkylenecarbonyloxyalkylene;

L² is selected from an alkylene, alkyleneoxy (linked to the silicon atom by an oxygen atom), oxyalkylene (linked to the silicon atom by a carbon atom), oxyalkyleneoxy, alkyleneoxycarbonylalkylene, alkylenecarbonyloxyalkylene, oxyalkyleneoxycarbonylalkylene, and oxyalkylenecarbonyloxyalkylene;

R¹ is, independently at each occurrence, a OH, Cl, $C_{1-6}$alkyl, $OC_{1-6}$alkyl group, or a covalent bond between the silicon atom and the oxygen atom from the support or from the cellulose fiber, and where at least one R¹ is such a covalent bond;

R² is H, $C_{1-6}$alkyle, or a -L¹-L²-Si(R¹)₃ group; and n is an integer selected from the numbers 1 to 2000, for example, from 1 to 1000, or from 1 to 500, or from 1 to 100, or from 1 to 50, or from 1 to 10.

For example, the organophosphorus group or phosphorus-containing polymeric chain is of Formula II:

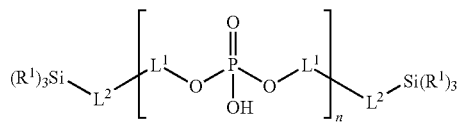

Formula II wherein L¹, L², R¹ and n are as defined in Formula I.

In some groups or chains of Formula I or II, the alkylene included in the L¹ alkylene, alkyleneoxycarbonylalkylene, or alkylenecarbonyloxyalkylene groups comprises from 1 to 4 carbon atoms, or from 2 to 4 carbon atoms, or alternatively 2 or 3 carbon atoms. Similarly, the alkylene included in the L² alkylene, alkyleneoxy, oxyalkylene, oxyalkyleneoxy, alkyleneoxycarbonylalkylene, alkylenecarbonyloxyalkylene, oxyalkyleneoxycarbonylalkylene, or oxyalkylenecarbonyloxyalkylene groups may comprise from 1 to 4 carbon atoms, or from 2 to 4 carbon atoms, or alternatively 2 or 3 carbon atoms.

According to another example, the organophosphorus group or phosphorus-containing polymeric chain is of Formula III:

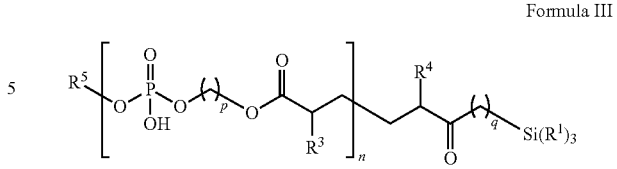

Formula III wherein,
R¹ and n are as defined in Formulae I and II;
R³ and R⁴ are, independently at each occurrence, a hydrogen atom or a $C_{1-3}$alkyl group;
R⁵ is H, $C_{1-6}$alkyl, or a —(CH₂)$_p$OC(O)CH(R³)CH₂CH₂CH(R⁴)(CH₂)$_q$—Si(R¹)₃ group;
p is an integer independently at each occurrence selected from the numbers 2 to 4; and
q is an integer independently at each occurrence selected from the numbers 1 to 4.

A subclass of this organophosphorus group or phosphorus-containing polymeric chain can be defined by Formula IV:

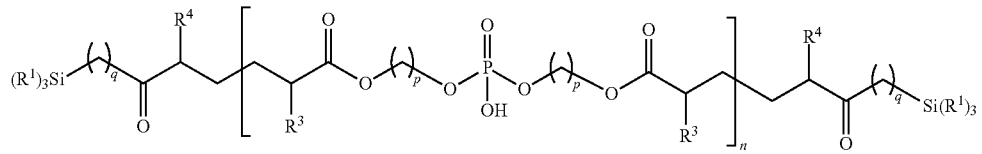

Formula IV wherein R¹, R³, R⁴, n, p and q are as defined in Formula III.

According to one example, p is 2 or 3, preferably 2, in Formulae III and IV. According to another example of these two formulae, q is a number within the range of from 2 to 4, preferably 2 or 3.

According to a variant of Formulae III and IV, R³ is a hydrogen or a methyl, preferably a methyl. According to another variant of Formulae III and IV, R⁴ is a hydrogen or a methyl, preferably a methyl. For instance, R³ and R⁴ may be methyl groups in each instance.

For example, R¹ is a covalent bond between the silicon atom and the oxygen atom of the support in at least one occurrence for the compound or polymer of Formulae I to IV. Preferably, R¹ is a covalent bond between the silicon atom and the oxygen atom of the support in at least three occurrences for the compound or polymer of Formulae I to IV. For instance, R¹ is a covalent bond with the support in each instance.

For example, R¹ is a covalent bond between the silicon atom and the oxygen atom of the cellulose fiber in at least one occurrence for the compound or polymer of Formulae I to IV. Preferably, R¹ is a covalent bond between the silicon atom and the oxygen atom of the cellulose fiber in at least three occurrences for the compound or polymer of Formulae I to IV. For instance, R¹ is a covalent bond with the cellulose fiber in each instance.

A material comprising a flame retardant covalently attached to a support formed of particles is also contemplated. In the latter, the particles of the support and the flame retardant are as defined herein.

This document also describes a separator-electrolyte component comprising the separator as described herein and an electrolyte. For example, the electrolyte comprises at least one of the following elements: an ionic salt, a polar, aprotic and non-aqueous solvent, a polymer, or an ionic liquid. The composition of the electrolyte can be liquid or gel and impregnate the separator. Alternatively, the electrolyte can be in solid form and be incorporated into the porosity of the separator.

Non-limiting examples of polar, aprotic and non-aqueous solvents include cyclic carbonates (ethylene carbonate (EC), propylene carbonate (PC), butylene carbonate (BC), vinylene carbonate (VC), and their derivatives); acyclic carbonates (dimethyl carbonate (DMC), diethyl carbonate (DEC), ethyl methyl carbonate (EMC), dipropyl carbonate (DPC), and their derivatives); lactones (γ-butyrolactone (γ-BL) and γ-valerolactone (γ-VL)); acyclic ethers (1,2-dimethoxyethane (DME), 1,2-diethoxyethane (DEE), ethoxymethoxyethane (EME), trimethoxymethane, etc.); cyclic ethers (tetrahydrofuran, 2-methyltetrahydrofuran, 1,3-dioxolane, and their derivatives); amides (formamide, acetamide, dimethylformamide), nitriles (acetonitrile, propylnitrile), nitromethane, phosphoric acid triester, dimethyl sulfoxide, sulfolane, methylsulfolane, and mixtures thereof.

For instance, the ionic salt may be a salt of an alkali or alkaline earth metal, preferably a lithium salt. Non-limiting examples of lithium salts include lithium hexafluorophosphate ($LiPF_6$), lithium bis(trifluoromethanesulfonyl)imide (LiTFSI), lithium bis(fluorosulfonyl)imide (LiFSI), lithium 2-trifluoromethyl-4,5-dicyano-imidazolate (LiTDI), lithium 4,5-dicyano-1,2,3-triazolate (LiDCTA), lithium bis(pentafluoroethylsulfonyl)imide (LiBETI), lithium tetrafluoroborate ($LiBF_4$), lithium bis(oxalato)borate (LiBOB), lithium nitrate ($LiNO_3$), lithium chloride (LiCl), lithium bromide lithium (LiBr), lithium fluoride (LiF), lithium perchlorate ($LiClO_4$), lithium hexafluoroarsenate ($LiAsF_6$), lithium trifluoromethanesulfonate ($LiSO_3CF_3$) (LiTf), lithium fluoroalkylphosphate $Li[PF_3(CF_2CF_3)_3]$ (LiFAP), lithium tetrakis(trifluoroacetoxy)borate $Li[B(OCOCF_3)_4]$ (LiTFAB), lithium bis(1,2-benzenediolato(2-)-O,O')borate $Li[B(C_6O_2)_2]$ (LBBB), or a combination thereof.

Examples of electrolyte polymers comprise linear, branched and/or crosslinked polyether polymers (e.g., polymers based on poly(ethylene oxide) (PEO), or poly(propylene oxide) (PPO) or a mixture of both (or an EO/PO copolymer), and optionally comprising crosslinkable units), polyacrylonitriles, methyl polymethacrylates, and other compatible polymers.

Non-limiting examples of ionic liquids include 1-ethyl-3-methylimidazolium bis-(trifluoromethanesulfonyl)imide, pyridinium fluorosulfonylimide, N-butyl-N-methylpyrrolidinium bis(fluorosulfonyl)imide, N-propyl-N-methylpyrrolidinium bis(fluorosulfonyl)imide, N-butyl-N-methylpyrrolidinium bis(trifluoromethanesulfonyl)imide, N-propyl-N-methylpyrrolidinium bis(trifluoromethanesulfonyl)imide, 1-octylpyridinium bis(trifluoromethanesulfonyl)imide, 1-octyl-2-methylpyridinium bis(trifluoromethanesulfonyl) imide, and 1-octyl-4-methylpyridinium bis(trifluoromethanesulfonyl)imide.

According to one example, the electrolyte comprises at least one ionic salt and at least one polar, aprotic and non-aqueous solvent. According to another example, the electrolyte comprises at least one ionic salt and at least one electrolyte polymer. According to another example, the electrolyte comprises at least one ionic salt, at least one solvent and at least one polymer. Each of these examples may also comprise an ionic liquid.

The present document also proposes an electrochemical cell comprising a negative electrode, a positive electrode, an electrolyte and a separator as defined herein. In the context of this document, by positive electrode is meant the electrode which acts as a cathode, when the battery delivers current (i.e., when discharging) and plays the role of anode when the battery is charging. Conversely, the negative electrode acts as the anode when the battery is discharging and as a cathode while the battery is charging.

According to one example, the positive electrode comprises a positive electrode material, which comprises an electrochemically active material, for example, in the form of particles. Examples of positive electrode electrochemically active materials include lithium metal phosphates, oxides, and complex oxides, such as $LiM'PO_4$ where M' is Fe, Ni, Mn, Co, or a combination thereof, $LiV_3O_8$, $LiMn_2O_4$, $LiM''O_2$, where M'' is Mn, Co, Ni, or a combination thereof (such NMC, $LiMn_xCo_yNi_zO_2$ with x+y+z=1), $Li(NiM''')O_2$, where M''' is Mn, Co, Al, Fe, Cr, Ti, and/or Zr, and their combinations. The positive electrode material may also further comprise a conductive material and/or a binder.

Examples of electronically conductive material comprise carbon black ($Ketjen^{MC}$ carbon, acetylene black, etc.), graphite, graphene, carbon nanotubes, carbon fibers (such as carbon nanofibers (e.g., VGCF formed in gas phase)), non-powdery carbon obtained by carbonization of an organic precursor, or a combination of at least two thereof.

Non-limiting binders examples include linear, branched and/or crosslinked polyether polymer binders (e.g., polymers based on poly(ethylene oxide) (PEO), or poly(propylene oxide) (PPO) or a mixture of both (or an EO/PO copolymer), and optionally comprising crosslinkable units), water soluble binders (such as SBR (styrene-butadiene rubber), NBR (acrylonitrile-butadiene rubber), HNBR (hydrogenated NBR), CHR (epichlorohydrin rubber), ACM (acrylate rubber)), or binders of the fluorinated polymer type (such as PVDF (polyvinylidene fluoride), PTFE (polytetrafluoroethylene), and their combinations). Some binders, such as those soluble in water, may also include an additive such as CMC (carboxymethylcellulose).

Other additives may also be present in the positive electrode material, such as lithium salts or inorganic particles such as ceramic or glass, or other compatible active materials (e.g., sulfur).

According to one example, the positive electrode material can be applied to a current collector (e.g., aluminum, copper) to form the positive electrode. For example, the current collector is made of carbon-coated aluminum. According to another variant, the positive electrode can be self-supporting.

The negative electrode includes a negative electrode electrochemically active material compatible with the positive electrode material. Examples of negative electrode electrochemically active materials include alkali and alkaline earth metals and alloys comprising them (for example, lithium, sodium, potassium), graphite and other carbon sources (porous carbon, carbon nanotubes, etc.), metal oxides and lithiated metal oxides (such as lithium titanate, vanadium oxide, lithiated vanadium oxide, etc.), and organic anode materials such as tetra-lithium perylene-3,4,9,10-tetracarboxylate (PTCLi4), naphthalene-1,4,5,8-tetracarboxylic dianhydride (NTCDA), perylene-3,4,9,10-tetracarboxylic dianhydride (PTCDA), Tr-conjugated dicarboxylates, and anthraquinone). As for the positive electrode, additional components may also be part of the negative electrode, such as an electronically conductive material, a binder, etc.

According to another aspect, an electrochemical cell of the present application is included in an electrochemical accumulator. For example, the electrochemical accumulator is selected from a lithium battery, a sodium battery, a potassium battery and a lithium-ion battery. According to a variant of interest, the electrochemical accumulator is a lithium-ion battery.

According to another aspect, the electrochemical accumulators of the present application are intended for use in mobile devices, for example mobile phones, cameras, tablets or laptops, in electric or hybrid vehicles, or in renewable energy storage.

EXAMPLES

The examples which follow are illustrative and should not be interpreted as limiting the scope of the invention as described.

Example 1—Preparation of a Cellulose Fiber Suspension

In this example, millimetric cellulose fibers in the form of industrial pulp (Sodra black $R^{MC}$) are used in order to reduce the manufacturing cost. The pulp does not receive additional treatments with acids or enzymes to reduce its size, nor the addition of chemicals such as hydrated aluminum sulfate to change its zeta potential (L. Jabbour, et al., *Cellulose,* 2013, 20, 1523-1545). This pulp is composed of fibers whose length is between 2.05 and 2.25 mm. For the preparation of a cellulose fiber suspension, 400 mg of cellulose pulp are dispersed in 200 mL of deionized water and vigorously mixed using an ULTRA-TURRAX® type mixer for at least 15 minutes. The mixture is cooled to room temperature and a second 200 mL portion of deionized water is added to obtain a suspension having a concentration of about 1 g of cellulose per liter. This mixture will then be used for the manufacture of cellulose separators with or without ceramics.

Example 2—Modification of Ceramic Support Surface

Halogenated or phosphate-containing groups are grafted onto ceramics (here $Al_2O_3$). Such groups are known as possessing flame retardant type properties (Kemmlein S., et al., *J. Chromatogr. A,* 2009, 1216, 320-333). The phosphate-containing molecules are namely used in the industrial sector (R. Sonnier, et al., *Eur. Polym. J.,* 2015, 68, 313-325, and R. Hajj, et al., *Polym. Deg. Stab.,* 2018, 147, 25-34).

(a) Grafting of Halogenated Molecules

Scheme 1 illustrates the procedure used for the grafting (A) of 2,5-dichlorophenyl groups on $Al_2O_3$; and (B) of 2,4,6-tribromophenyl on $Al_2O_3$ particles. As illustrated, the diazonium chemistry was used for the grafting of these halogenated molecules to the $Al_2O_3$ ceramic surface. The aromatic amine is transformed in its corresponding diazonium ion, which in turn is reduced or decomposed to form a radical which is grafted to the surface of the particles (D. Béanger, J. Pinson, *Chem. Soc. Rev.,* 2011, 40, 3995-4048).

For a given amount of ceramic dispersed in anhydrous acetonitrile, is added 1 equivalent of 2,5-dichloroaniline (A) or 2,4,6-tribromoaniline (B). After dissolving the amine, 5 equivalents of tert-butyl nitrite are added, and the solution is gently heated at 70° C. for 18 hours. The reaction mixture is then filtered, and the resulting powder is washed successively with DMF and acetone before being dried in an oven at 80° C.

(b) Polymerization of a Phosphate-Containing Molecule

Scheme 2 illustrates schematically the procedures used for (A) the grafting of methacrylate reactive functions of the surface of $Al_2O_3$ by reaction with functionalized silanes; and (B) the polymerization of a phosphate-containing molecule.

Firstly, the acrylate functions are grafted to the surface of the $Al_2O_3$ ceramic. For a given amount of ceramic dispersed in anhydrous acetonitrile, 0.5 equivalent of 3-(trimethoxysilyl)propyl methacrylate is added and the mixture is heated at 90° C. for 23 hours. The mixture is then cooled to room temperature. The powder is isolated by filtration and rinsed once with acetone.

Secondly, the polymerization of a phosphate-containing molecule is initiated by a thermal initiator. For a given quantity of modified ceramic, 0.5 equivalent of bis[2-(methacryloyloxy)ethyl] phosphate and 0.01 equivalent of azobisisobutyronitrile (AIBN) are added. The reaction mixture is then heated at 70° C. under nitrogen for 18 hours. After reaction, the solution is filtered and then the resulting powder is washed several times with acetone before being dried in an oven at 80° C. The powder obtained is named $Al_2O_3$-polyacrylatephosphate.

Example 3—Synthesis of a Flame Retardant Ceramic

The $Mg_2B_2O_5$ ceramic, whose flame retardant properties have been identified (O. Sheng, et al., Nano Lett., 2018, 18, 3104-3112). The procedure used for the preparation of ceramic filaments is inspired by the work of S. Li et al. (S. Li et al., Mater. Lett., 2010, 64, 151-153).

In a Teflon container, 20.331 g of $MgCl_2 \cdot 6H_2O$ are added to 7.567 g of $NaBH_4$. Zirconium oxide balls (about 200 g) are added and the container is closed and placed in a planetary ball mill of the Pulverisette $6^{MC}$ type. To form the ceramic, 120 hours of mixing are required at 300 RPM, successively making 120 cycles of 60 minutes mixing and 30 minutes pause to avoid overheating the device. The entirety of the powder is collected and placed in ceramic crucibles which are in turn inserted into a tube furnace. The thermal treatment is carried out in air with a 2° C./min ramp from room temperature up to 800° C. The temperature is maintained at 800° C. for 2 hours before allowing the oven to cool down to room temperature. The powder is then well washed with distilled water to remove the sodium chloride formed. The powder is then left to dry in a vacuum oven at 100° C.

Example 4—Preparation of a Separator

FIG. 1 shows a method of manufacturing cellulose-based separators. The separator cellulose fibers make it a paper film type separator. The method used is also similar to the industrial papermaking process.

A precise volume of the diluted cellulose solution (1 g/L) according to Example 1 corresponding to 50 mg of cellulose fibers, is rapidly filtered on a Nylon membrane (pore size: 0.22 μm, diameter: 47 mm). The suction is then maintained for at least 15 minutes. During that time, 5 or 10 mg ceramic ($Al_2O_3$ modified according to Example 2 or not modified, or $Mg_2B_2O_5$ prepared in Example 3) are dispersed in a small amount of distilled water and mixed with an ultrasonic probe until a homogeneous suspension is obtained. The suspension is filtered over the previously formed cellulose film and suction is maintained for 1 hour to completely dry the separator. The cellulose film is then removed from the Nylon filter and is calendered at 80° C. using heated rollers. It is cut in 19 mm diameter circle to be used as coin type battery separator. The paper separator is then placed under vacuum at 120° C. overnight to remove residual traces of water before being used in a battery. Ceramic-free paper films are also made for comparison. The resulting separators are about 35-40 µm thick and do not lose material during cutting and calendering.

Example 5—Physicochemical Characterization of Ceramics and Separators (a) Methods Used
i. Thermogravimetry Thermogravimetric analysis curves of ceramic powders and separators were recorded using a TGA 550 (instruments TA) model apparatus with a heating rate of 10° C./min from 30 to 700° C. and a gas flow rate of 90 mL/min. The measurements are made in air and nitrogen for the ceramics and separators, respectively.

ii. Infrared

Infrared spectra were recorded between 400 and 4000 $cm^{-1}$ with a Bruker Vertex 70 spectrometer equipped with a smart ATR accessory.

iii. Microscopy

The surfaces of ceramic powders and cellulose films were analyzed using a TESCAN Mira 3 type scanning electron microscope (SEM). The micrograph and X-ray map were acquired with an accelerating voltage of 5 kV, a probe current of 500 pA, and a working distance of 10 mm.

Optical photographs and 3D images were obtained with a Keyence VK-X200 confocal laser optical microscope. Optics with 20, 50, and 150× magnifications were used as well as a violet laser (408 nm)

iv. X-Ray Photoelectron Spectroscopy

The surface chemical composition (5 nm deep) of $Al_2O_3$ and $Al_2O_3$-phenyl-2,5-dichloro powders was studied by X-ray photoelectron spectroscopy (XPS), using a PHI 5600-ci (Physical Electronics, Eden Prairie, MN) spectrometer. The main chamber of the device was maintained at a <8.10-9 Torr pressure. A standard aluminum X-ray source (Al kα=1486.6 eV) was used to record the survey spectra (1400-0 eV, 10 min), while magnesium was used to obtain high resolution spectra, both without charge neutralization. The detection angle was set to 45° with respect to the sample surface and the analyzed zone was of 0.5 $mm^2$. High-resolution C 1s and O 1s spectra were obtained with 30 and 20 scans, respectively.

v. X-Ray Diffraction

Diffraction patterns were obtained with a Rigaku Smart-Lab X-ray diffractometer (XRD) with a Cobalt Kα source with a step of 0.04°.

vi. Thermal Stability

A thermal stability visual test was carried out in air in an oven for the various cellulose separators and a Celgard type separator. The films are placed in a heating chamber and the temperature is gradually increased from 25 to 175° C. The temperature is kept constant at 25, 50, 75, 100, 125, 150 and 175° C. for 15 minutes and a photograph is taken for all separators before moving to the next temperature.

vii. Vertical Flame Test

The separators are suspended in a black box placed under a hood. They are previously soaked for about 10 seconds in the standard electrolyte used in a battery, here a 1 M $LiPF_6$ solution in a mixture of ethylene carbonate and ethyl methyl carbonate (EC:EMC) in a 3:7 volume ratio, then quickly drained to avoid evaporation of the solvent. Immediately thereafter, a flame is brought into contact with the separator. The experiment is stopped when a carbonization is obtained or, in the case of Celgard, when the flame goes out. In some cases, multiple ignitions may be necessary.

(b) Results
i. Ceramics

Figure 2:
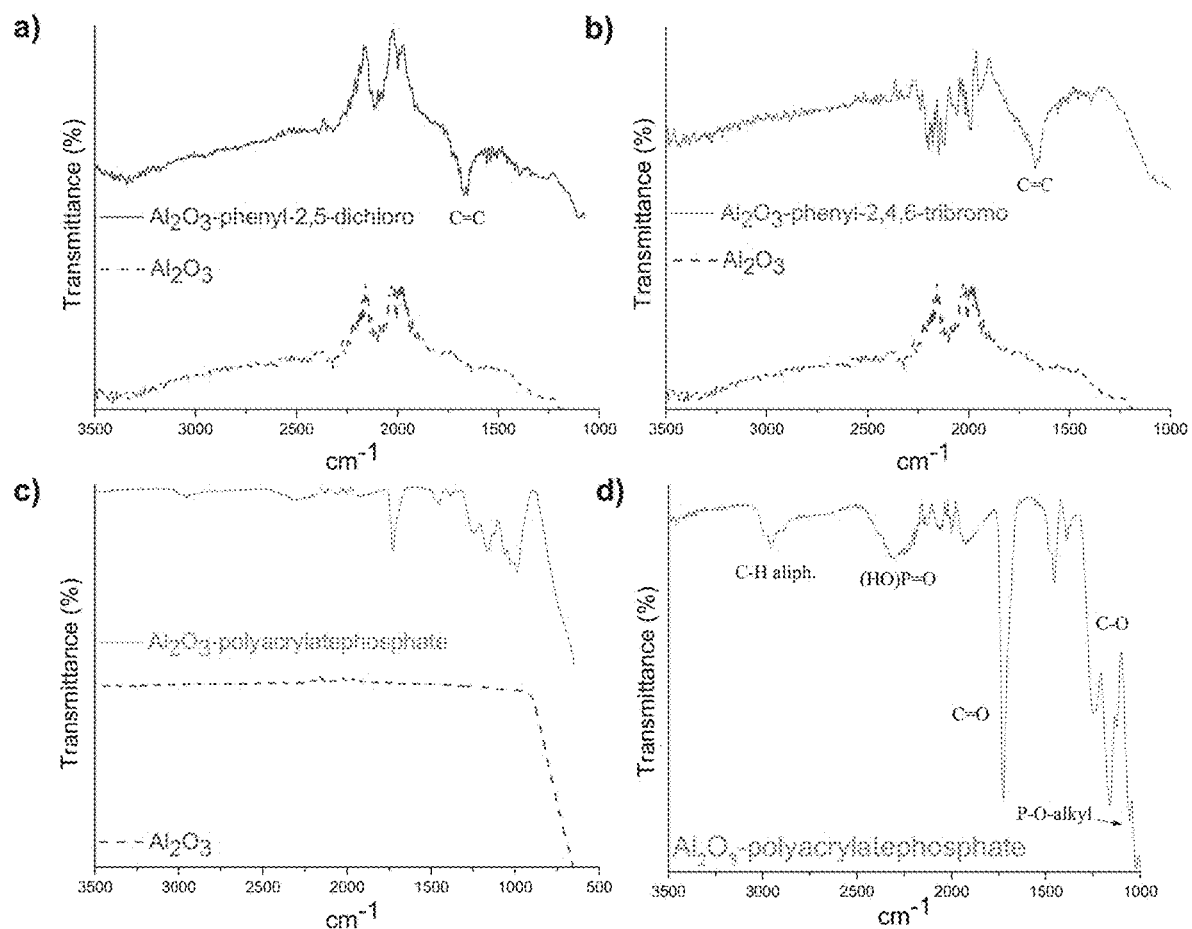
FIG. 2 shows infrared spectra of powders (a) $Al_2O_3$-phenyl-2,5-dichloro and $Al_2O_3$; (b) $Al_2O_3$-phenyl-2,4,6-tribromo and $Al_2O_3$; (c) $Al_2O_3$-polyacrylatephosphate and $Al_2O_3$; and (d) $Al_2O_3$-polyacrylatephosphate (enlargement).

Infrared spectra of the various $Al_2O_3$ powders are presented in FIG. 2. The low presence of halogenated aryl groups is confirmed by the weak band around 1600 $cm^{-1}$ for the $Al_2O_3$-phenyl-2,5-dichloro (FIG. 2(a)) and $Al_2O_3$-phenyl-2,4,6-tribromo (FIG. 2(b)) powders. This band, absent from the unmodified powder, is attributed to the C=C bond of the aromatic rings. This weak signal indicates a fairly low grafting rate. C—Br and C—Cl bands cannot be visible on the infrared spectra, as they are expected under 800 $cm^{-1}$ and thus hidden by the very intense $Al_2O_3$ band. For the $Al_2O_3$-polyacrylatephosphate powder (FIG. 2(c)), the spectrum is very different from that of $Al_2O_3$ and confirms that the grafting and surface modification reactions have taken place. A zoom in FIG. 2(d) shows the different characteristic bands of the polymer created on the surface of the ceramic (see Scheme 2(B) for the structure). It includes in particular the bands associated with aliphatic C—H (~2900 $cm^{-1}$), with C=O (~1700 $cm^1$) and C—O (~1200 $cm^{-1}$) bonds, and with the phosphate function with its various contributions on the spectrum.

Figure 3:
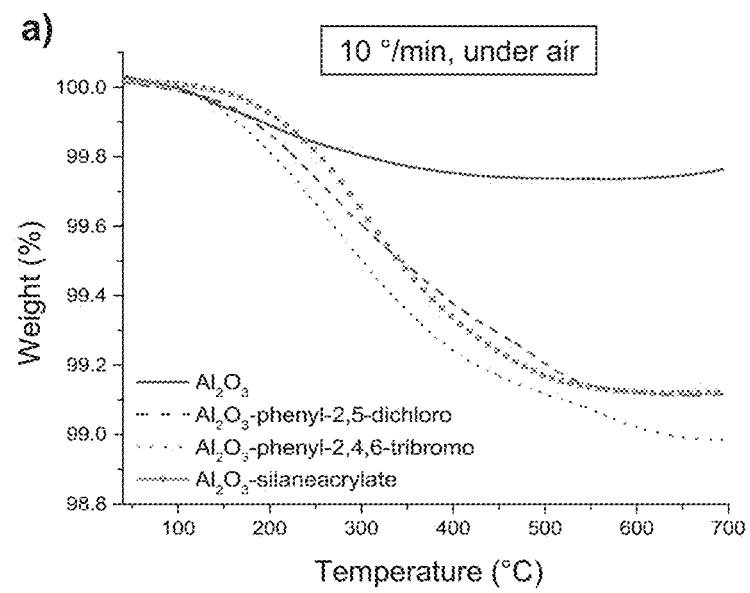
FIG. 3 presents the thermogravimetric curves of powders (a) $Al_2O_3$, $Al_2O_3$-phenyl-2,5-dichloro, $Al_2O_3$-phenyl-2,4,6-tribromo and $Al_2O_3$-silaneacrylate; then (b) $Al_2O_3$ and —$Al_2O_3$-polyacrylatephosphate.
Figure 3:
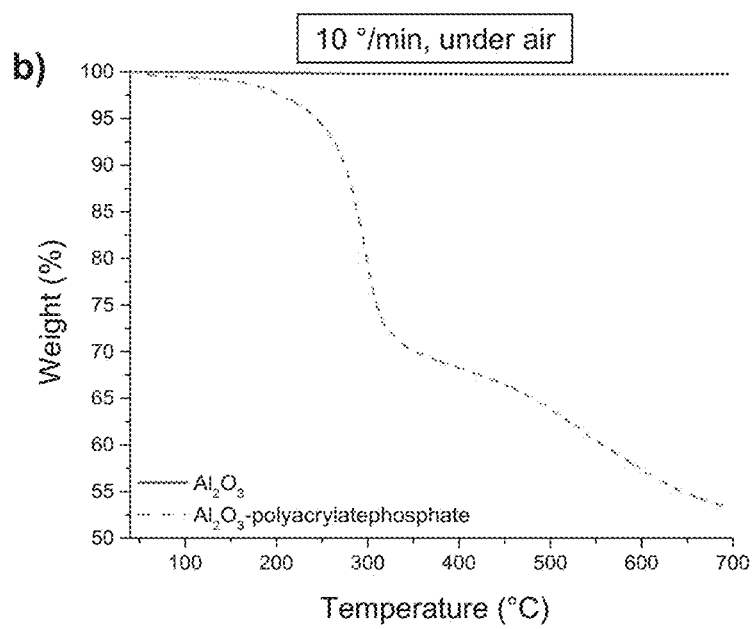

The thermogravimetric curves of modified $Al_2O_3$ powders, shown in FIG. 3(a), are in agreement with the results of the infrared analysis since they show a small loss of mass for the powders modified by the diazonium chemistry. The $Al_2O_3$-silaneacrylate powder, shown in Scheme 2(A), also exhibits a low mass loss, but confirms that a thin layer of acrylate functions is present on the surface of the $Al_2O_3$ particles. Polymerization of the monomer containing the phosphate function with acrylate functions initially present on the surface of $Al_2O_3$ is also confirmed by thermogravimetric analysis (see FIG. 3(b)) with a mass loss of nearly 30% at around 280° C. followed by a gradual loss of about 15-20% up to 700° C.

Figure 4:
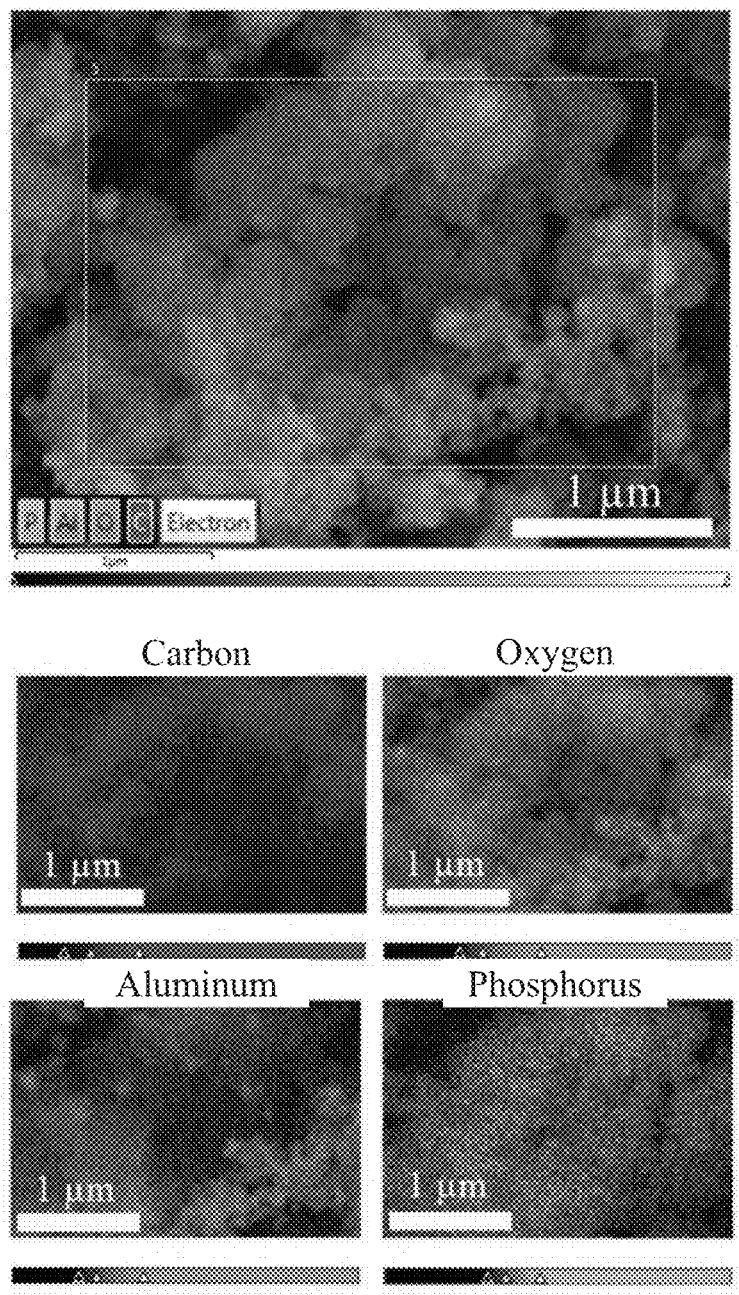
FIG. 4 shows scanning electron microscope images of the $Al_2O_3$-polyacrylatephosphate powder with its corresponding chemical mapping: carbon, oxygen, aluminum and phosphorus.

The $Al_2O_3$-polyacrylatephosphate powder was analyzed by scanning electron microscopy (SEM) in order to demonstrate the presence of the phosphorus-containing polymer on the ceramic surface. FIG. 4 presents a SEM image showing agglomerates of spherical particles. The chemical distribution of the C, Al, O and P elements is also provided. The aluminum and oxygen coming from the $Al_2O_3$ particles are clearly visible since the chemical mapping for these two elements brings out the contours of the ceramic agglomerates. Phosphorus (in blue) and carbon (in red) are found everywhere and cover the $Al_2O_3$ particles well.

Figure 5:
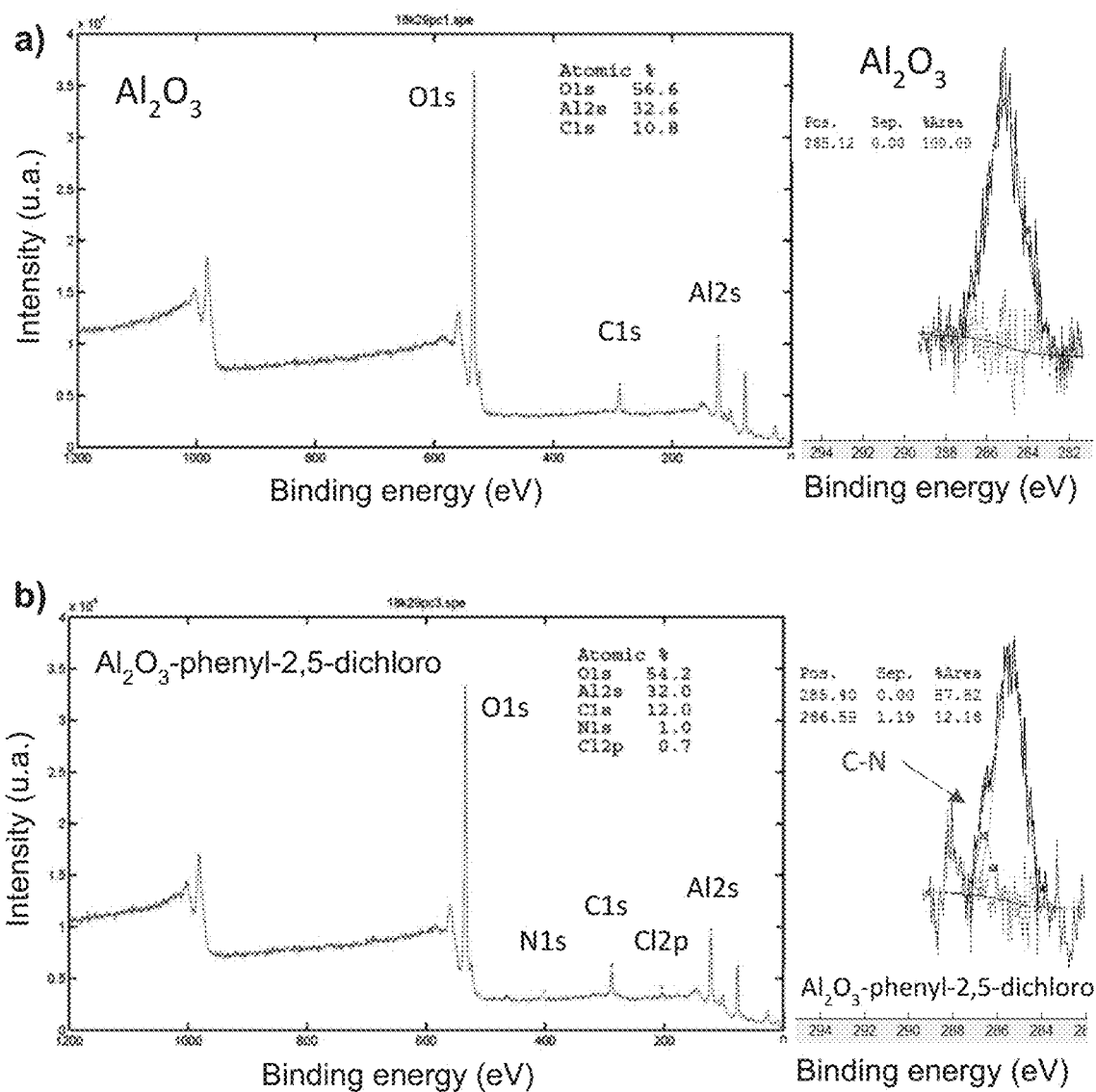
FIG. 5 shows the survey (left) and core (right) XPS spectra of (a) $Al_2O_3$ and (b) $Al_2O_3$-phenyl-2,5-dichloro powders.

The survey (left) and core (right) XPS spectra of $Al_2O_3$ and $Al_2O_3$-phenyl-2,5-dichloro powders are shown in FIGS. 5(a) and 5(b). This surface analysis makes it possible to demonstrate the presence of chlorine and nitrogen in low concentration after modification, as can be seen on the survey spectrum of the grafted ceramic. The C 1s core spectra of the two powders are slightly different and a small contribution at 287 eV, associated with the C—N bonds of azo bridges that may exist, is observable.

Figure 6:
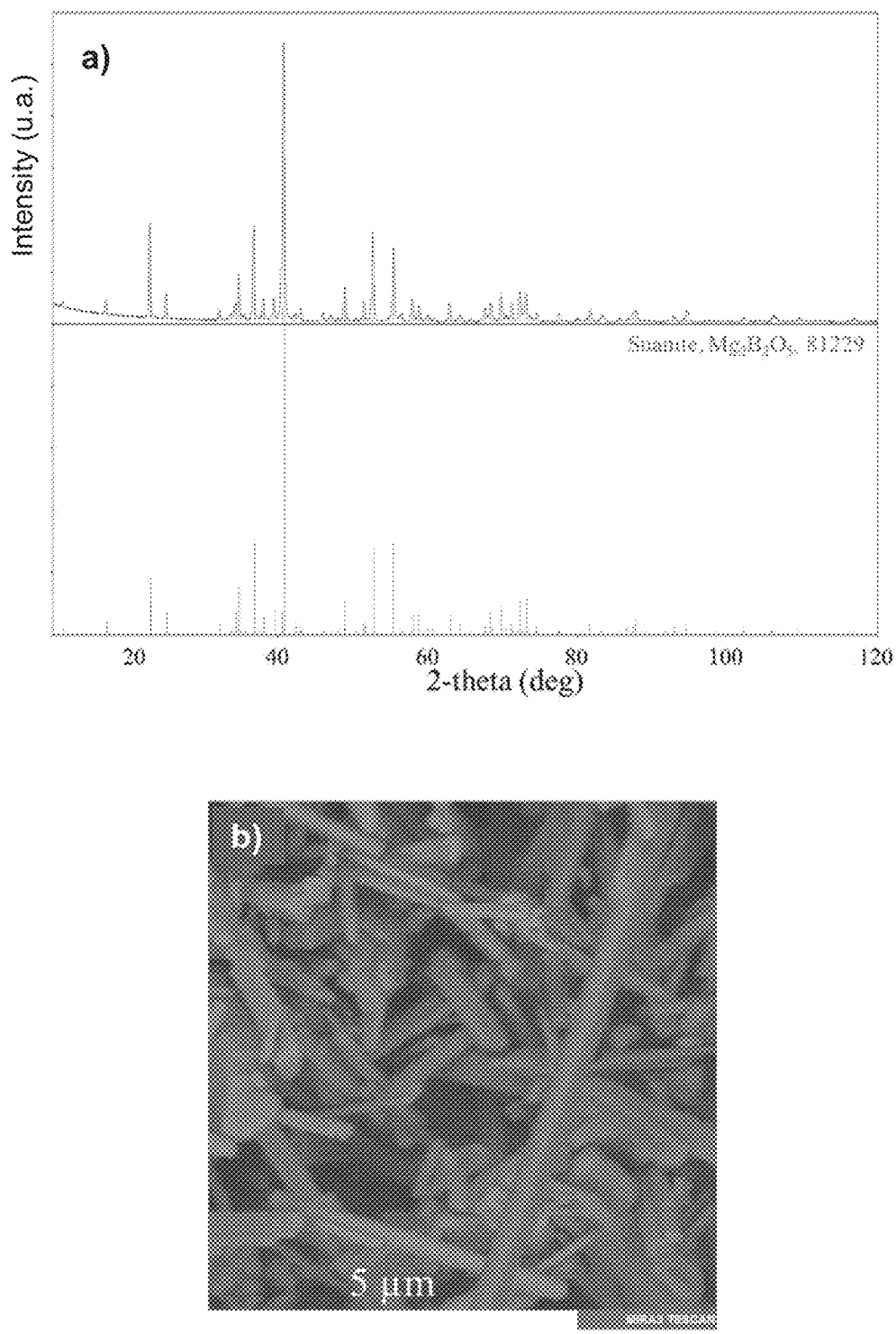
FIG. 6 shows (a) the X-ray diffraction spectrum and (b) the scanning electron microscope image of the $Mg_2B_2O_5$ powder.

The X-ray diffractogram and SEM image of the synthesized $Mg_2B_2O_5$ powder are shown in FIGS. 6(a) and 6(b), respectively. The powder was found to be very pure and X-ray diffraction only revealed one crystalline phase belonging to $Mg_2B_2O_5$. For the morphology, the powder consists of ceramic rods which can range from a few hundred nanometers to a few tens of micrometers.

ii. Separators

The thermal resistance of the separators was first evaluated by placing the Celgard®-3501 (comparative), cellulose (comparative) and cellulose+$Mg_2B_2O_5$ separators in an oven at different temperatures between 25 and 175° C. Photographs of films taken at the different temperatures are shown in FIG. 7. At 75° C., the Celgard®-3501 already begins to bend on itself under the effect of heat and at 175° C., it is completely degraded. In contrast, the two cellulose-based separators are completely stable up to this temperature.

Figure 8:
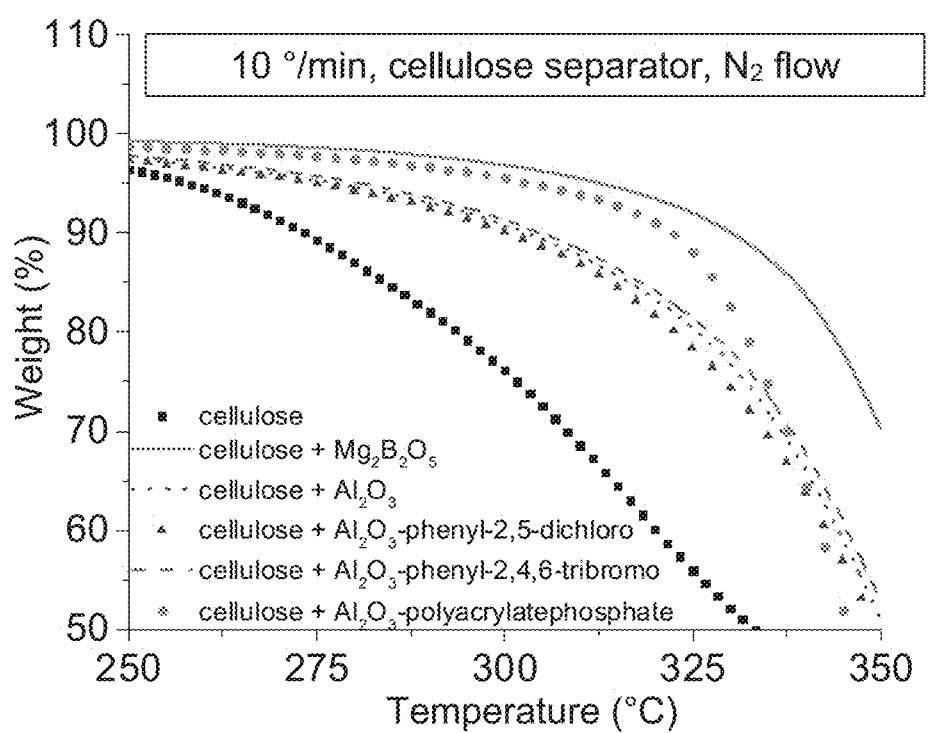
FIG. 8 shows the thermogravimetric curves of various cellulose films containing ceramics or not.

Thermogravimetric curves under nitrogen of the various cellulose separators are shown in FIG. 8. From 250° C., a gradual loss of mass is observed for the separator made entirely of cellulose. The addition of $Al_2O_3$ allows the separator to withstand longer and is stable up to around 300° C. When the $Al_2O_3$-phenyl-2,5-dichloro and $Al_2O_3$-phenyl-2,4,6-tribromo modified ceramics are used, the effect on thermal stability is similar to that obtained with the use of $Al_2O_3$ powder. This can be explained by the low grafting rates on these powders as observed in the results presented in FIGS. 2, 3 and 5. The separator made with $Al_2O_3$-polyacrylatephosphate is itself much more stable and degrades around 325° C. This result was anticipated since the amount of grafted polymer was greater in this case (see FIG. 3(b) and FIG. 4). Finally, the cellulose+$Mg_2B_2O_5$ separator is the most stable and begins to severely degrade around 340° C. Thus, it is about 75° C. more stable compared to the separator made entirely of cellulose (bottom curve).

Figure 9:
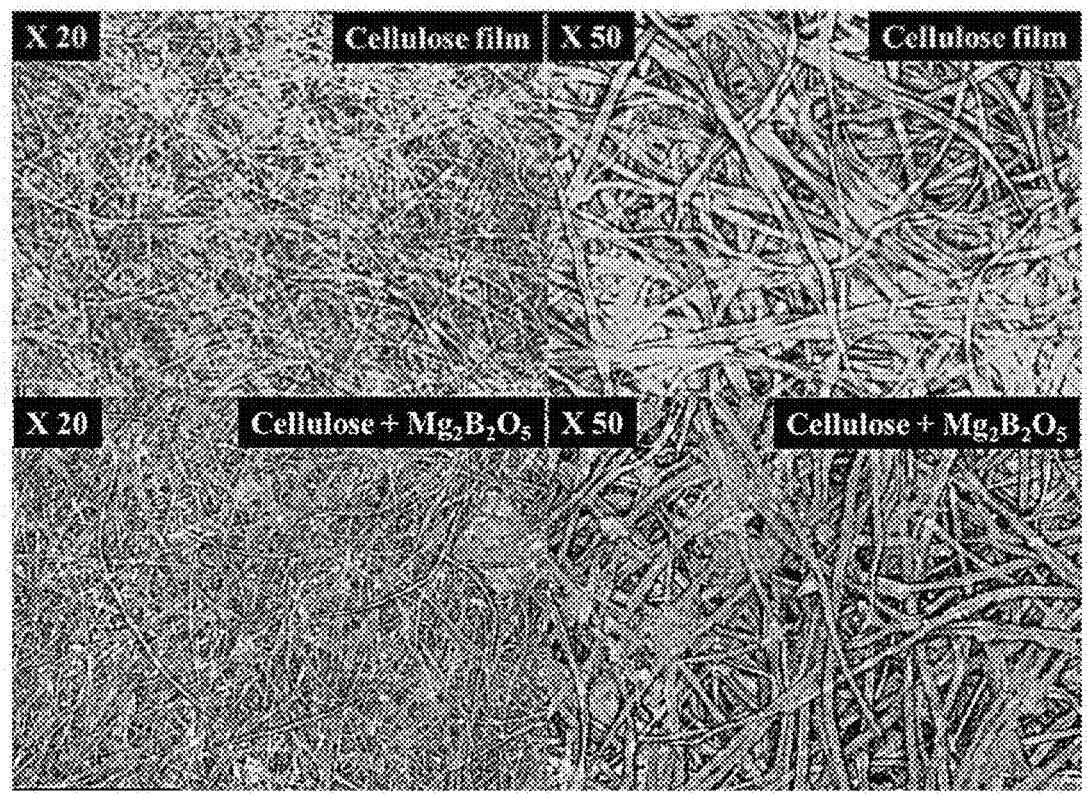
FIG. 9 presents SEM images at ×20 (left) and ×50 (right) magnifications of cellulose (top) and cellulose+$Mg_2B_2O_5$ (bottom) separators.
Figure 10:
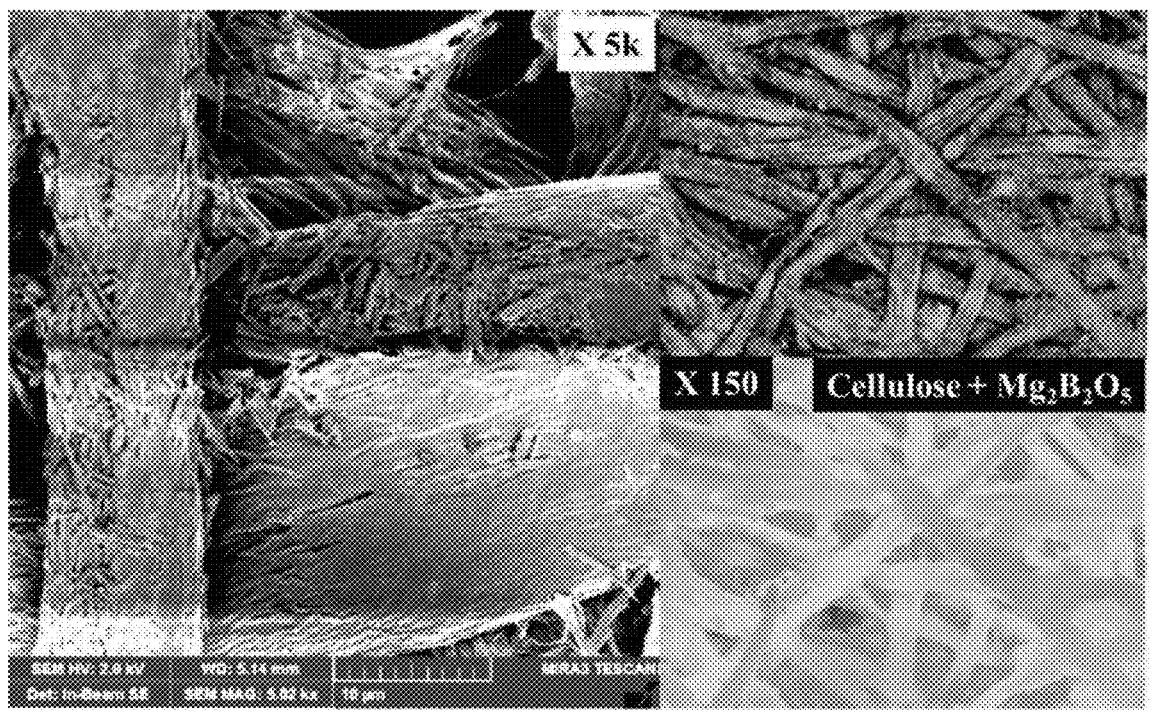
FIG. 10 presents SEM images at ×5000 (left) and ×150 (right) magnifications of the cellulose+$Mg_2B_2O_5$ separator. The color image (bottom right) highlights the porosity (red=near; blue=far).

FIG. 9 shows SEM images at ×20 (left) and ×50 (right) magnifications of the cellulose (top) and cellulose+$Mg_2B_2O_5$ (bottom) separators. The entanglement of micrometric cellulose fibers allows for a very strong mechanical strength. The addition of ceramic does not change the fibers arrangement and does not affect the film's mechanical strength. Higher magnifications, such as those presented in FIG. 10, show that the $Mg_2B_2O_5$ rods attach themselves almost everywhere on the cellulose fibers, probably due to the alcohol functions which interact with the ceramic magnesium ions. However, there are no large $Mg_2B_2O_5$ agglomerates formed and most of the porosity is retained as can be seen with the relief image (FIG. 10, colored image). The fact that the cellulose fibers are covered with ceramic allows better thermal resistance and is in perfect agreement with the results of thermogravimetric analysis presented in FIG. 8.

Figure 11:
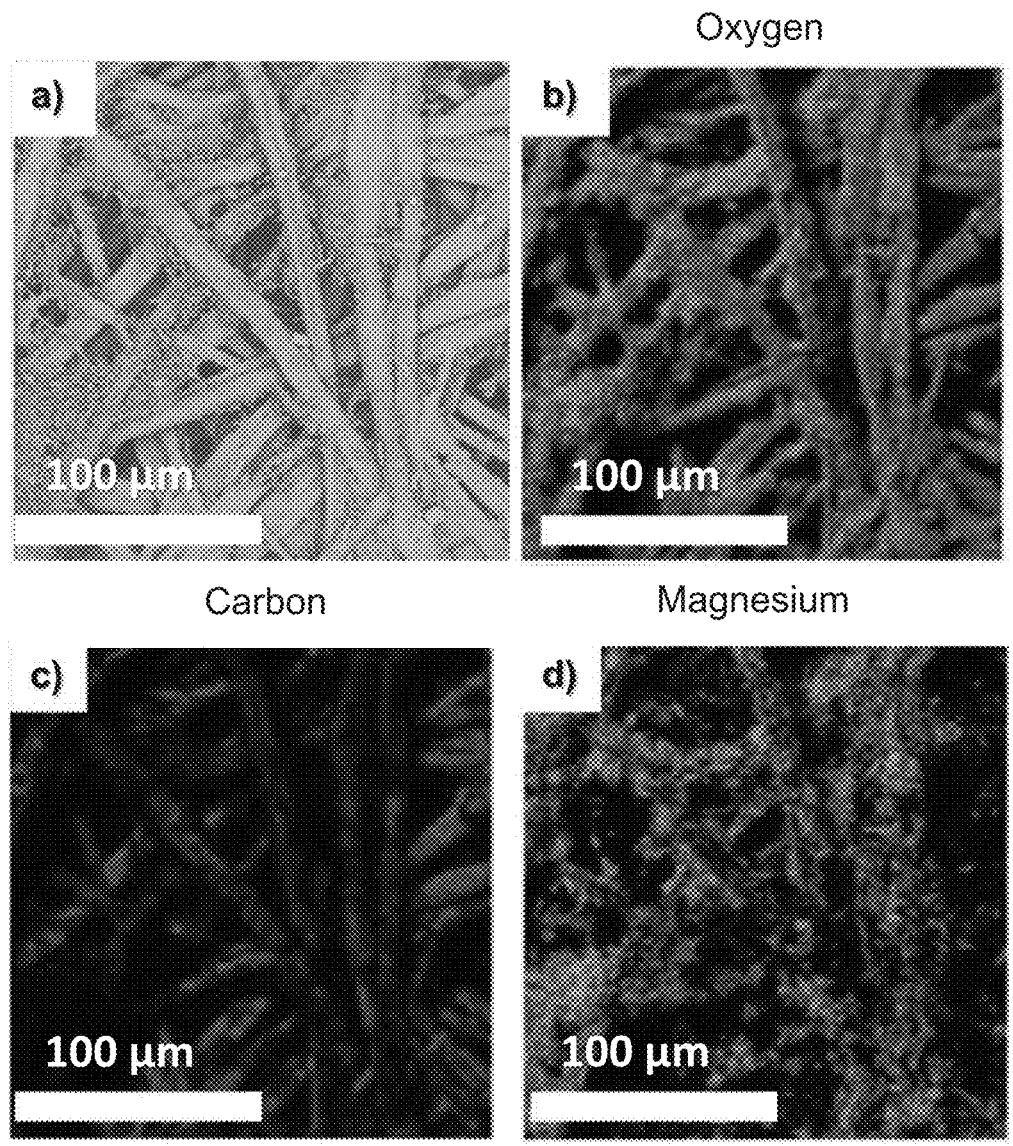
FIG. 11 presents SEM images of (a) the cellulose+ $Mg_2B_2O_5$ separator and its corresponding chemical mapping: (b) oxygen, (c) carbon, and (d) magnesium.

FIG. 11 shows an SEM image (a) of the cellulose+$Mg_2B_2O_5$ separator with its corresponding chemical mapping allowing to highlight the presence of oxygen (b), carbon (c), and magnesium (d). Image (d) clearly shows the total coverage of the cellulose fibers with the ceramic. A few areas richer in $Mg_2B_2O_5$ are observed without it blocking the porosity.

Figure 12:
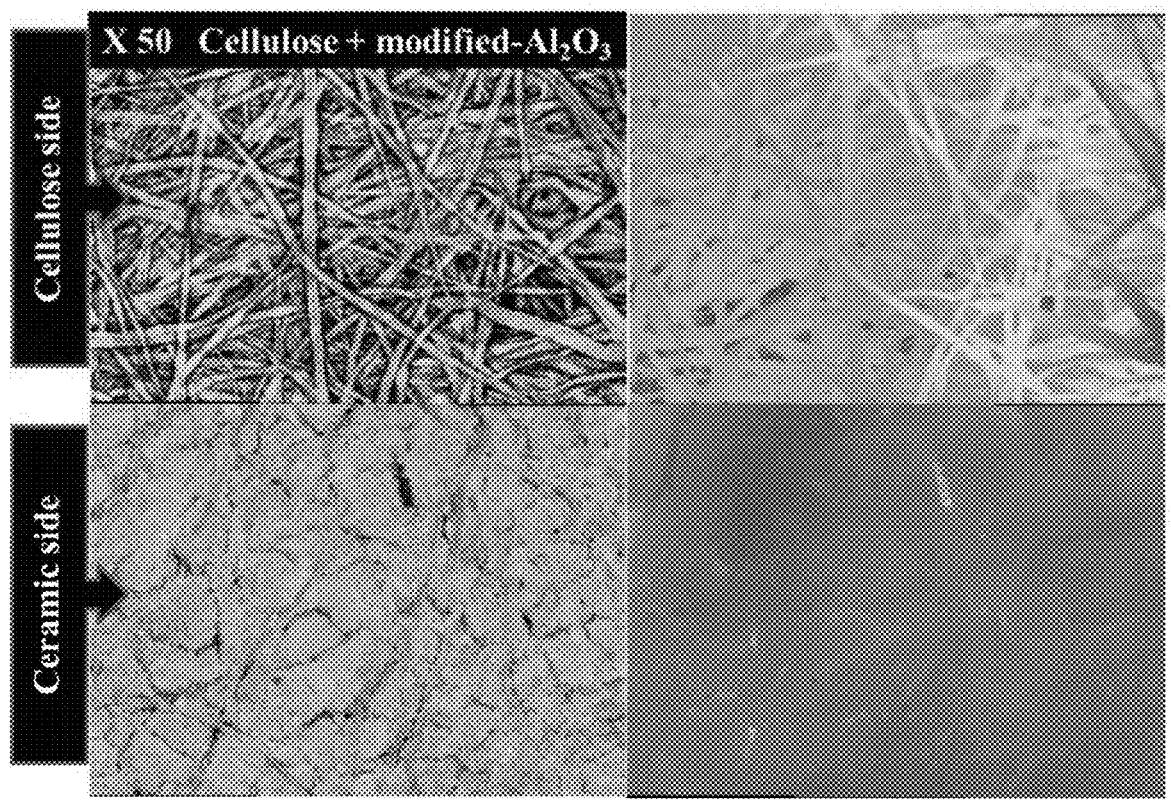
FIG. 12 presents SEM images at a ×50 magnification of both sides (ceramic and cellulose) of the cellulose+$Al_2O_3$-phenyl-2,5-dichloro separator. The color images (right) highlight the porosity (red=near; blue=far).

FIG. 12 shows SEM and relief images at ×50 magnifications of both sides (ceramic and cellulose) of the cellulose+$Al_2O_3$-phenyl-2,5-dichloro separator. The result is completely different from that obtained with the cellulose+$Mg_2B_2O_5$ separator (see FIG. 10). After manufacture, a side rich in very porous cellulose and another side highly saturated in ceramic with an extremely low porosity are obtained. In addition, ceramic covering the cellulose fibers is not observed as could be seen with $Mg_2B_2O_5$, because chemical interactions are different. By increasing the ceramic concentration during manufacture, the porosity could all be filled. It is also conceivable to make a mixture of $Mg_2B_2O_5$ to cover the cellulose fibers and $Al_2O_3$ to fill the porosity.

Figure 13:
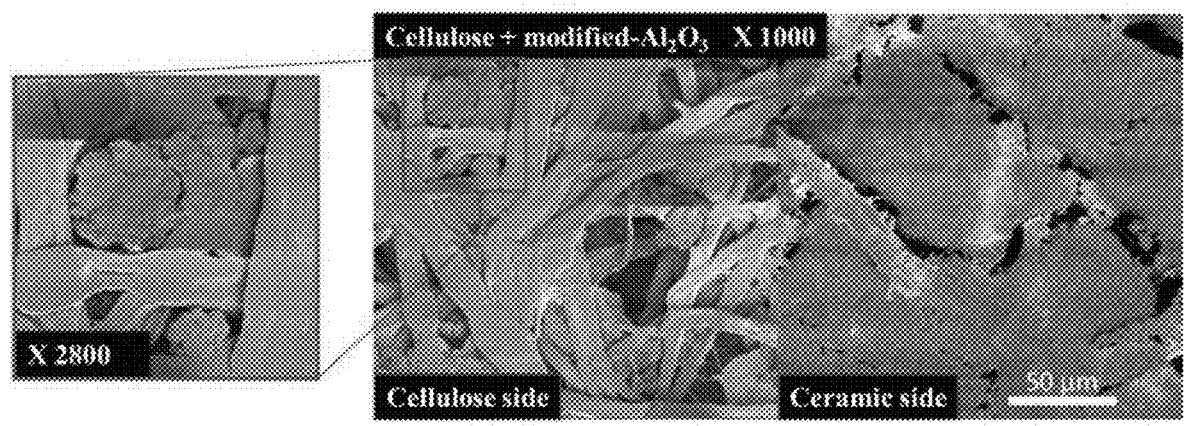
FIG. 13 presents SEM images at ×1000 and ×2800 magnifications of both sides (ceramic and cellulose) of the cellulose+$Al_2O_3$-phenyl-2,5-dichloro separator.

FIG. 13 shows SEM images of the same cellulose+$Al_2O_3$-phenyl-2,5-dichloro film on both sides with higher magnifications. The ceramic tends to form large agglomerates of several tens of micrometers which are trapped in the film porosity. A few ends up on the cellulose-rich side and get stuck between cellulose fibers, but the majority accumulate on the ceramic-rich side of the separator.

FIGS. 19 to 24 show images of Celgard®-3501 (comparative), cellulose (comparative), cellulose with $Mg_2B_2O_5$, cellulose with $Al_2O_3$, cellulose with $Al_2O_3$-phenyl-2,5-dichloro (Example 2(a)), and cellulose with $Al_2O_3$-polyacrylatephosphate (Example 2(b)) separators, respectively, when subjected to the vertical flame test according to Example 5(a)(vii). Results from this test are summarized in Table 1 below.

TABLE 1

Number of ignitions and total time required to burn the separator

| Separator | Number of ignition(s) | Time to burn (s) |
|---|---|---|
| Celgard ™ | 1 | <2 |
| Cellulose | 2 | 4 |
| Cellulose + $Mg_2B_2O_5$ | 2 | 8 |
| Cellulose + $Al_2O_3$ | 2 | 10 |
| Cellulose + $Al_2O_3$-phenyl-2,5-dichloro | 3 | 15 |
| Cellulose + $Al_2O_3$-polyacrylatephosphate | 3 | 24 |

While the Celgard™ separator burned instantly, cellulose separator without flame retardant exhibited a rapidly extinguishing flame and, after a second ignition, the cellulose separator burned to produce charcoal which stopped before complete combustion of the separator. Interestingly, with the addition of $Mg_2B_2O_5$ the charcoal formation was reduced, and the combustion took twice as long. The substitution of $Mg_2B_2O_5$ by $Al_2O_3$, demonstrated an even greater efficiency since the combustion does not take less than 10 seconds. However, the amount of charcoal formed appears to be greater in this case. This difference may be due to the fact that $Mg_2B_2O_5$ covers the surface of the cellulose fibers rather than filling the porosity as could be seen for $Al_2O_3$ according to SEM observations.

The addition of chloro-aryl groups to $Al_2O_3$ resulted in more smoke on the first ignition and 3 attempts were required to burn the separator after 15 seconds. Finally, the best results were obtained with the separator containing the $Al_2O_3$-polyacrylate phosphate particles. Indeed, this separator barely burned after 24 seconds and requested that the flame be maintained for several seconds to start the ignition.

Example 6—Electrochemical Tests (a) Battery Assembly

The different separators were tested in coin cells and combined with an NMC cathode (composition: NCM523 (93%), Super C65 (3%), SFG6L (1%), PVdF (3%); active mass: 10.5 mg/cm$^2$; density: 3.2 g/cm$^3$) and a graphite anode (composition: graphite (97.5%), CMC (1.1%), SBR (1.4%); active mass: 5.5 mg/cm$^2$; density: 1.5 g/cm$^3$). A reference was assembled with the same electrodes and a Celgard®-3501 type industrial separator. The electrolyte used is a 1 M solution of $LiPF_6$ in the EC:EMC (3:7) mixture. The batteries were assembled in a glove box under argon with an oxygen content of less than 10 ppm.

(b) Electrochemical Tests

All the electrochemical tests are carried out with a VMP3 potentiostat. The electrochemical stability of cellulose films in the electrolyte is evaluated by cyclic voltammetry. The cellulose film is then used as a working electrode and separated from a lithium counter-electrode by a Celgard®-3501 separator. The scan rate is 0.5 mV/s, and the scans are recorded between 2 and 5 V vs. Li/Li$^+$.

NMC/graphite batteries are cycled between 3 and 4.4 V for two formation cycles in C/24 and 100 cycles in C/10. An electrochemical impedance measurement is taken regularly at 3 V at the end of the discharge.

i. Electrochemical Stability of the Cellulose Fibers

Figure 14:
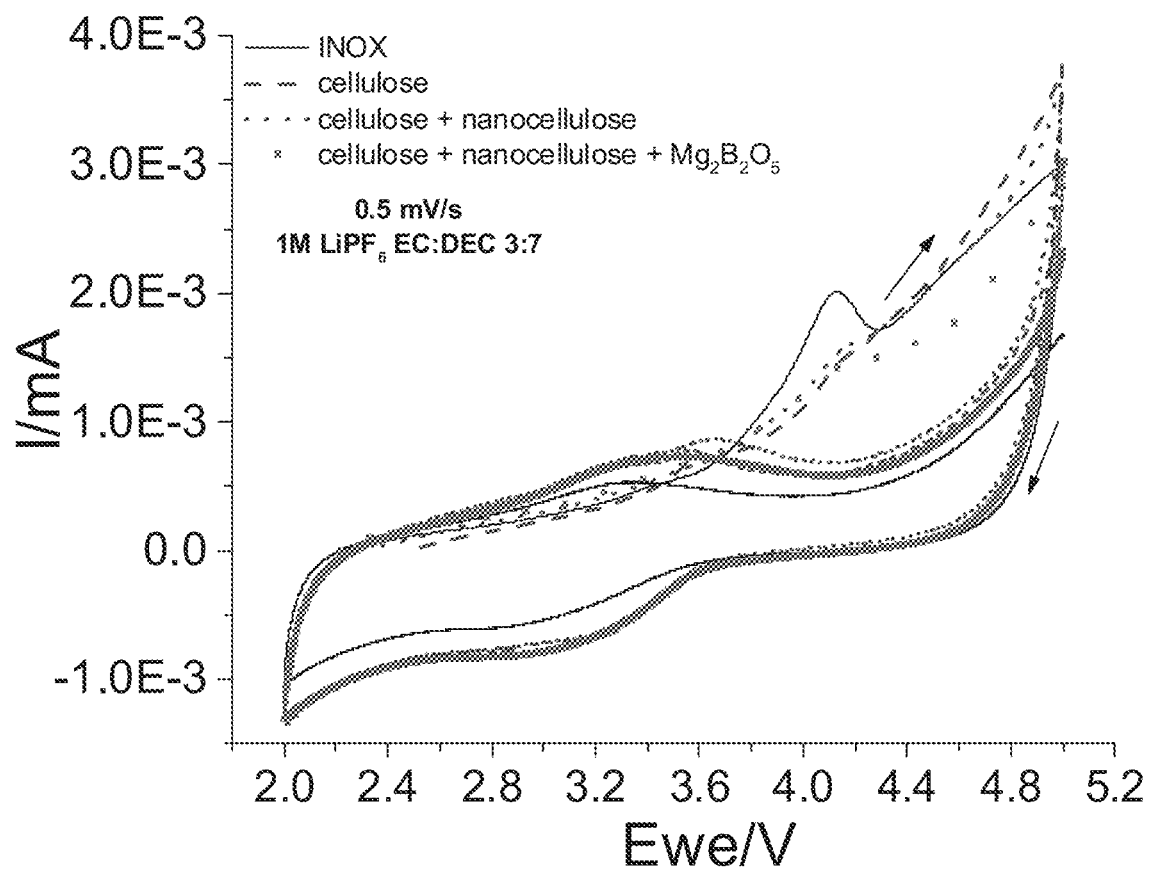
FIG. 14 shows the cyclic voltammograms between 2 and 5 V vs $Li/Li^+$ of a stainless-steel electrode and films of cellulose, cellulose+nanocellulose, and cellulose+nanocellulose+$Mg_2B_2O_5$.

The electrochemical stability of cellulose fibers was evaluated by cyclic voltammetry in the electrolyte used in battery. FIG. 14 shows cyclic voltammograms between 2 and 5 V vs. Li/Li$^+$ for the cellulose, cellulose+nanocellulose, and cellulose+nanocellulose+Mg$_2$B$_2$O$_5$ films. A reference consisting in simply using a stainless-steel spacer as the working electrode has also been added for comparison. During the first cycle, an anode peak is observed between 3.8 and 5 V vs. Li/Li$^+$ and attributed to the irreversible oxidation of the electrolyte. This well-known phenomenon is still present in the following cycles, but in a less pronounced way. The voltammograms for cellulose separators with and without Mg$_2$B$_2$O$_5$ are identical to the reference. These results demonstrate that cellulose fibers are not electroactive and therefore can be used in a Li-ion battery and more specifically for high voltage batteries like NMC/graphite.

ii. Electrochemical Performance of NMC/Graphite Batteries

NMC/graphite batteries were assembled as in (a) with the various cellulose separators and with a Celgard®-3501 as a comparison. Nickel manganese cobalt oxide (NMC) is known to be a material that can cause thermal runaway in Li-ion batteries during an overcharge (D. Ouyang, et al., *Appl. Sci.*, 2017, 7, 1314). It is therefore a perfect candidate to be combined with cellulose separators containing the ceramics and flame retardants.

Figure 15:
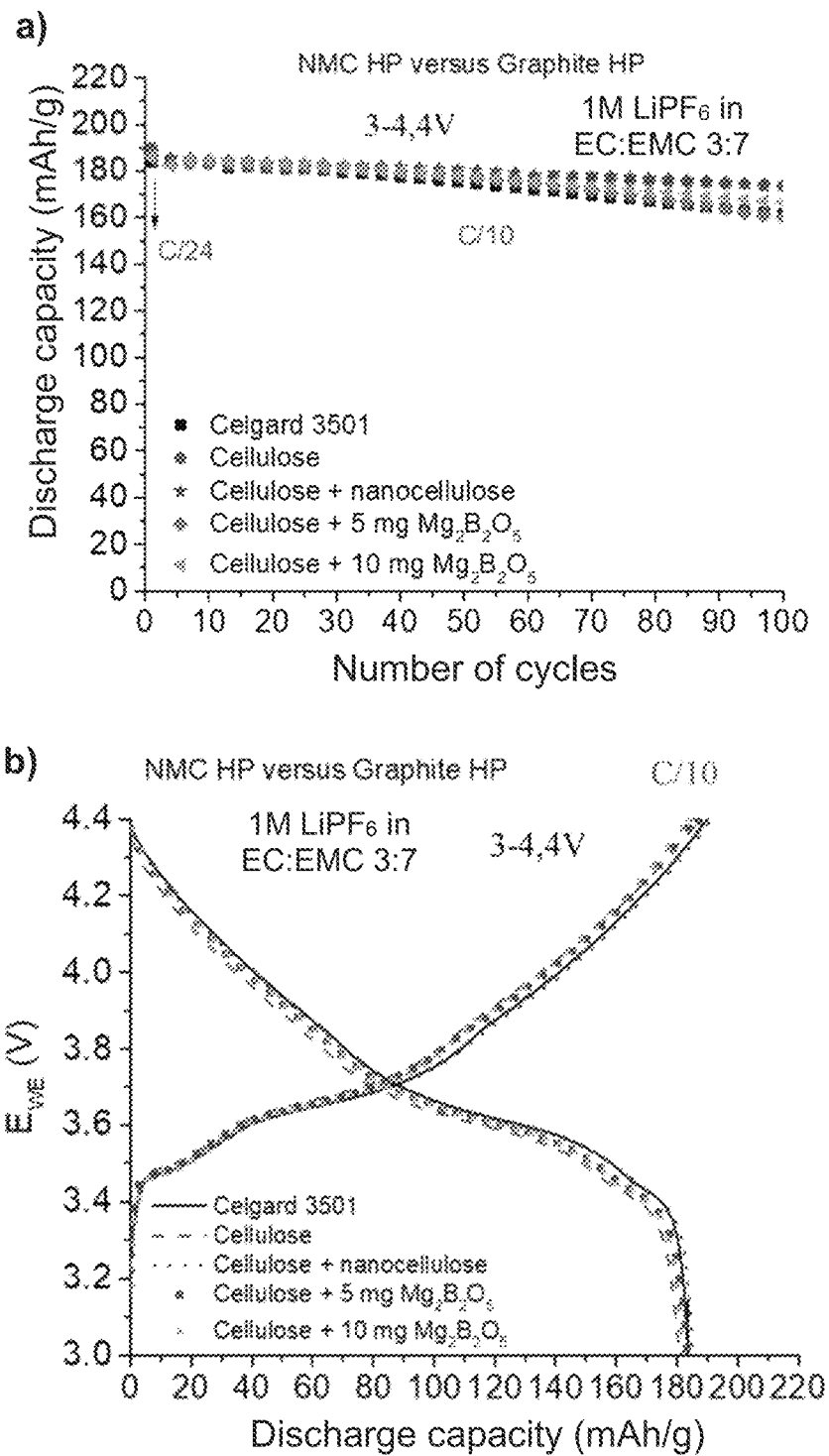
FIG. 15 shows (a) the galvanostatic cycling in C/10 between 3 and 4.4 V and (b) the charge/discharge curves of NMC/graphite batteries assembled with various separators.
Figure 16:
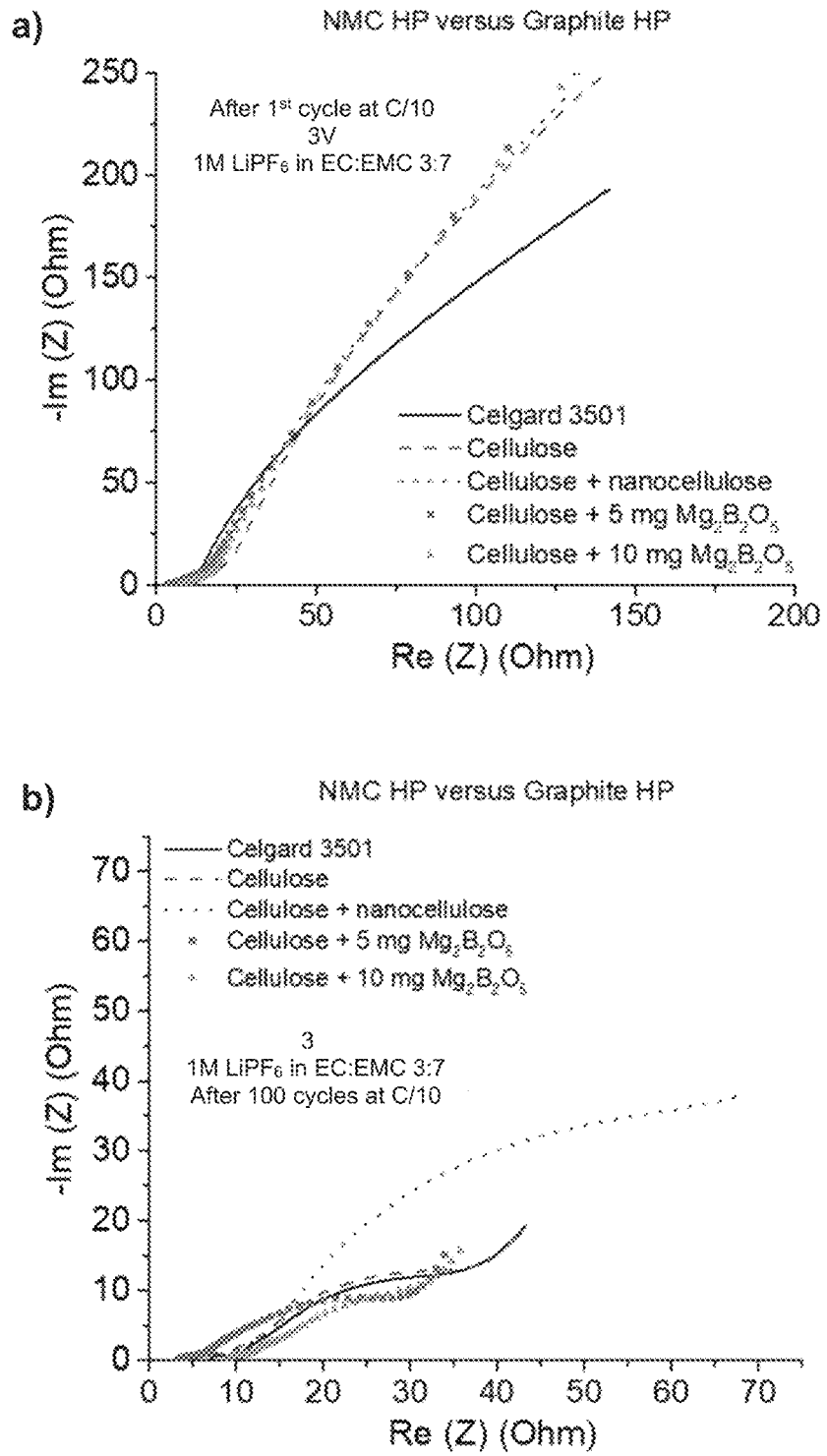
FIG. 16 shows the Nyquist diagrams recorded at 3 V after (a) the first and (b) the $100^{th}$ charge/discharge cycle in C/10 of NMC/graphite batteries assembled with various separators.

FIG. 15 shows (a) the C/10 cycling for 100 cycles and (b) the first charge and discharge in C/10, of NMC/graphite batteries assembled with separators made of cellulose, a mixture of cellulose+Mg$_2$B$_2$O$_5$ and a Celgard®-3501. The charge/discharge curves in FIG. 15(*b*) have the same profile and deliver a specific capacity of approximately 180 mAh/g dependent on the potential range. The cycling stability is relatively similar for all batteries showing a gradual loss of capacity which may be due to the electrolyte degradation or to active material dissolution. From the Nyquist diagrams in FIG. 16, it would appear that this capacity loss is due more to the gradual dissolution of the electrodes rather than to an increase in resistance caused by electrolyte oxidation. Indeed, impedances recorded at 3 V decrease as the cycling progresses and the difference is striking between the 1$^{st}$ (see FIG. 16(*a*)) and the 100$^{th}$ cycle (see FIG. 16(*b*)) of charge/discharge in C/10.

Figure 17:
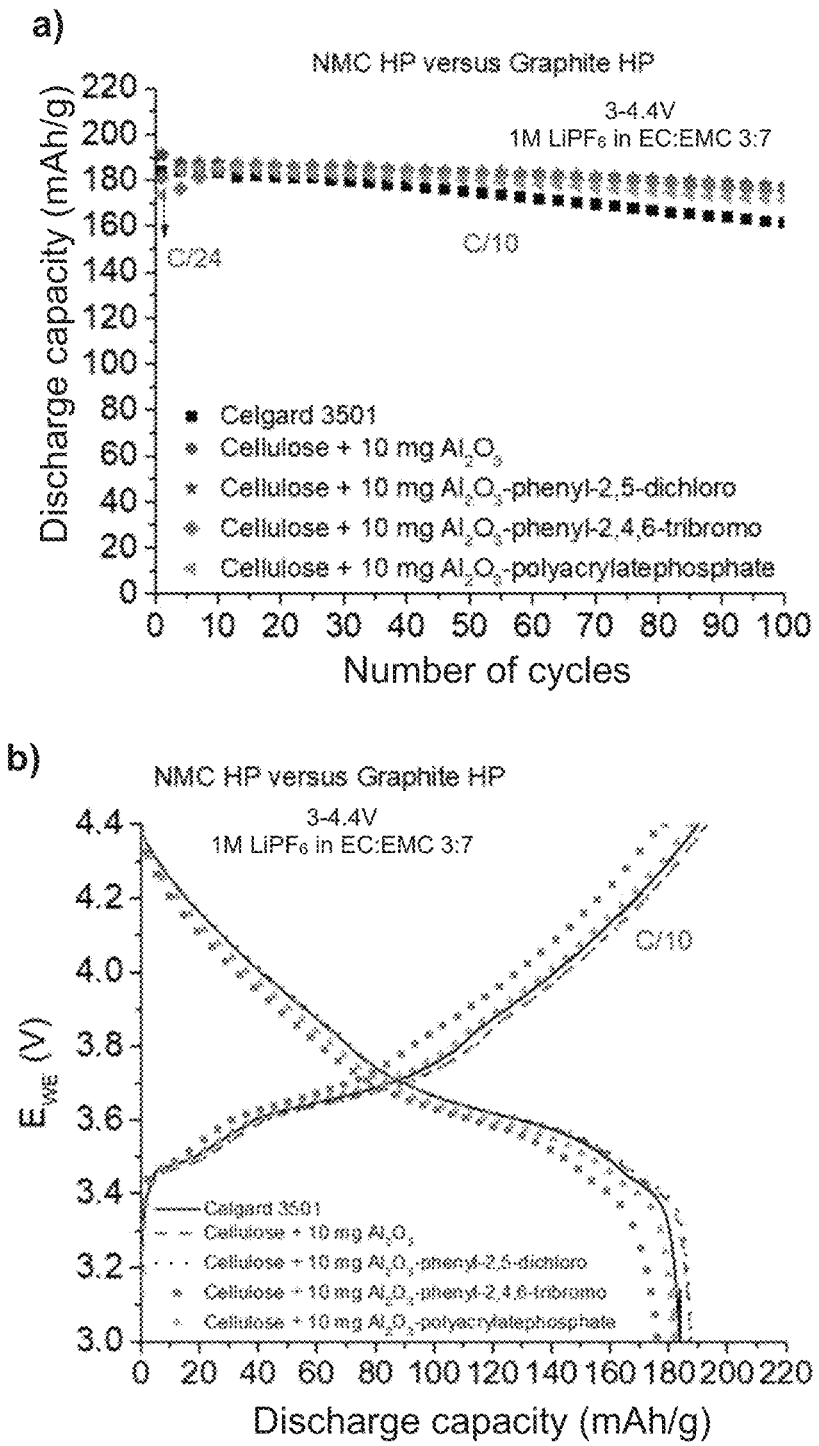
FIG. 17 presents (a) the galvanostatic cycling in C/10 between 3 and 4.4 V, and (b) the charge/discharge curves of NMC/graphite batteries assembled with various separators.
Figure 18:
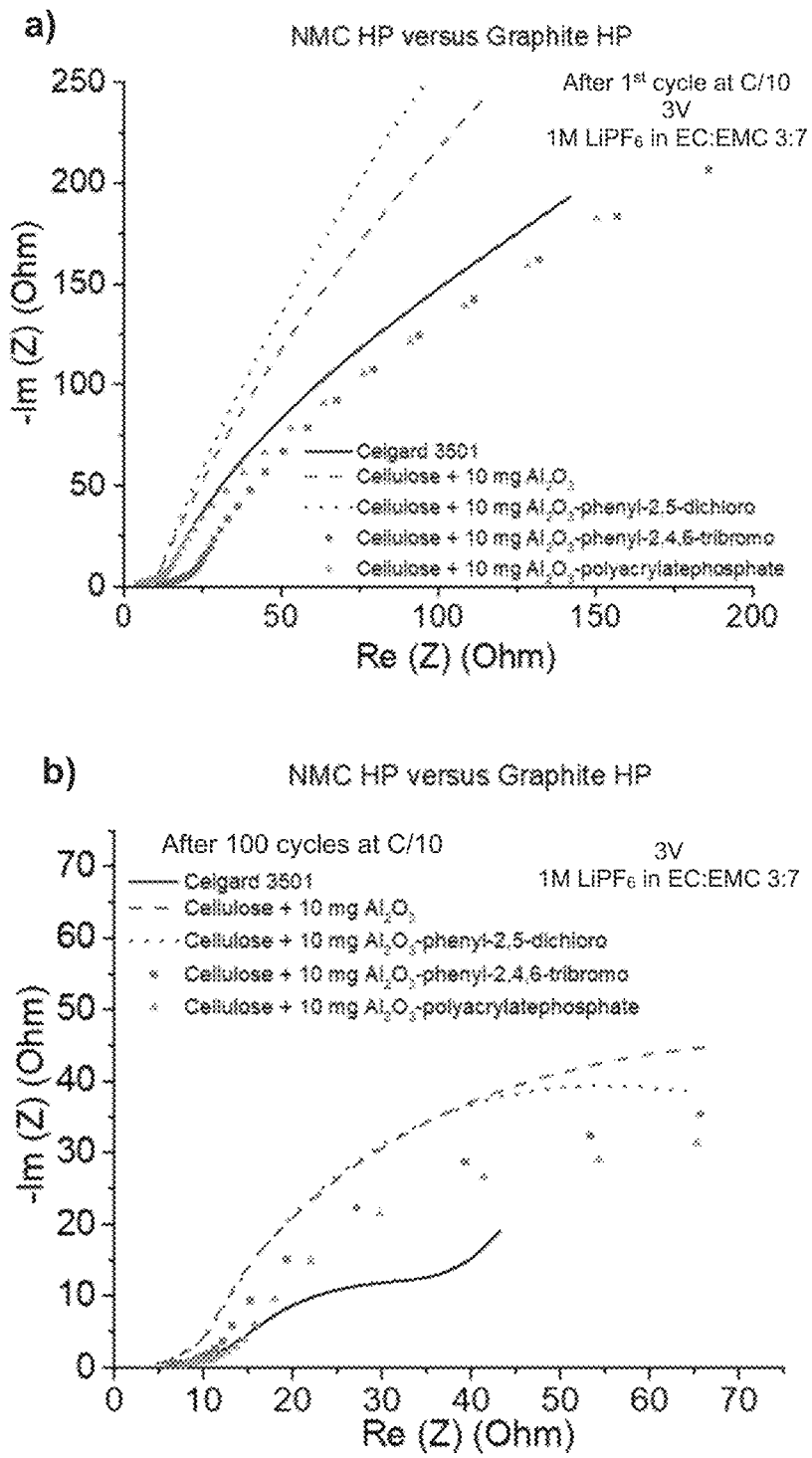
FIG. 18 shows the Nyquist diagrams recorded at 3 V after (a) the first and (b) the $100^{th}$ charge/discharge cycle in C/10 of NMC/graphite batteries assembled with various separators.
Figure 19:
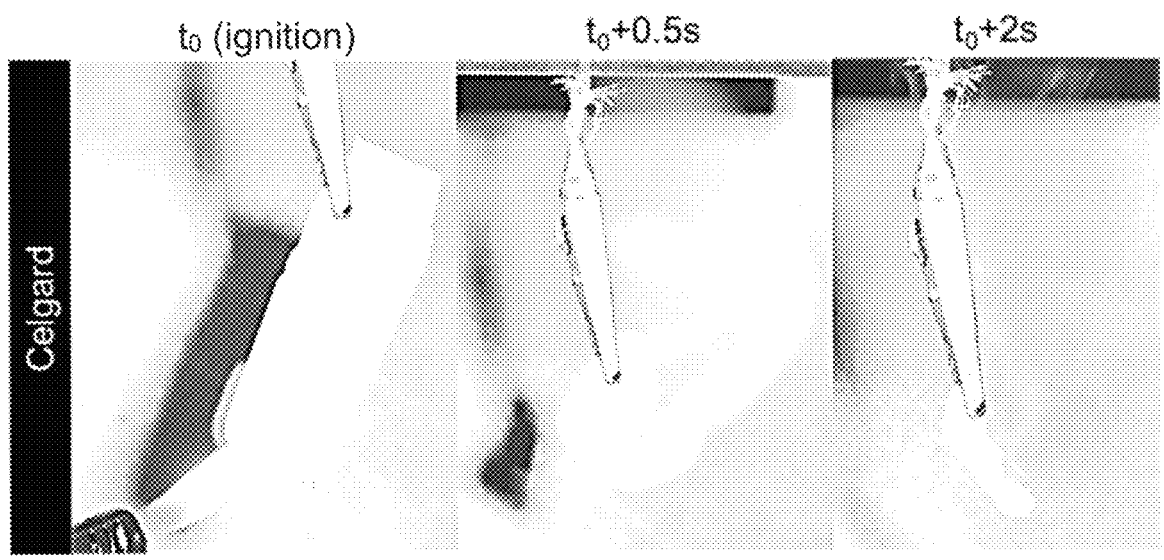
FIG. 19 shows photographs of a Celgard®-3501 separator at ignition (left), after 0.5 seconds (center), and after 2 seconds (right).
Figure 20:
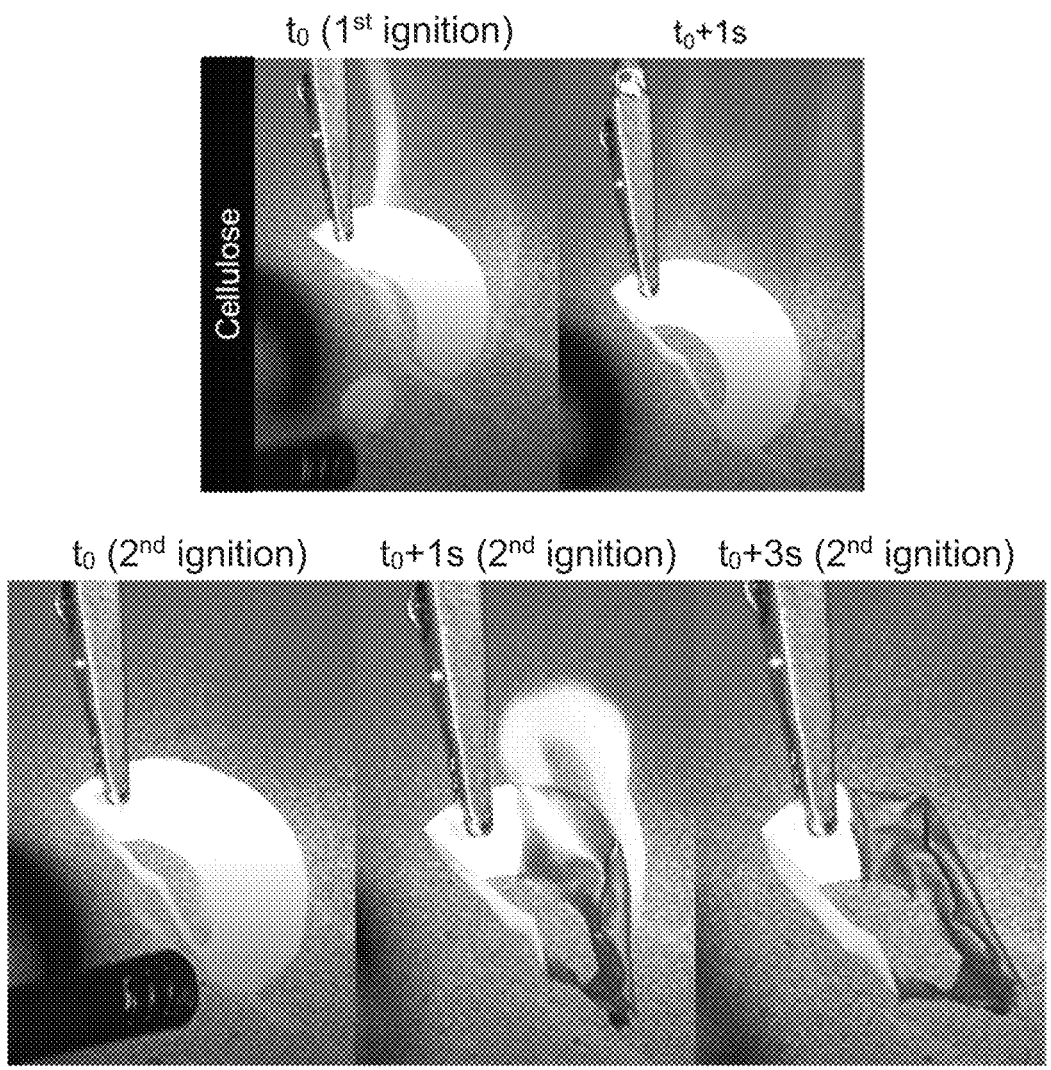
FIG. 20 shows photographs of a cellulose separator at first ignition (top left), after 1 second (top right), at second ignition (bottom left), after 1 second (bottom center), and after 3 seconds (bottom right).
Figure 21:
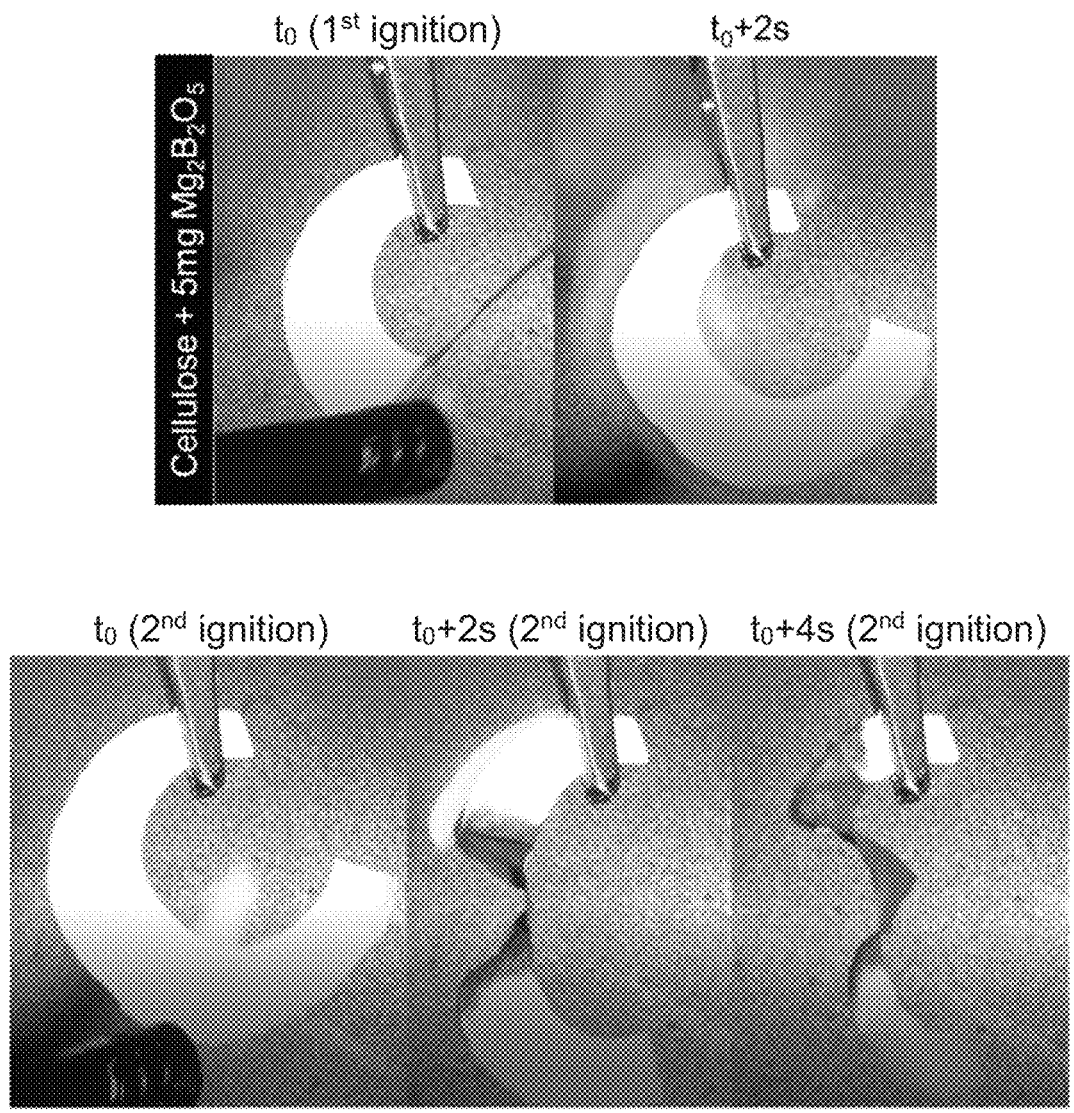
FIG. 21 shows photographs of a cellulose separator with $Mg_2B_2O_5$ at first ignition (top left), after 2 seconds (top right), at second ignition (bottom left), after 2 seconds (bottom center), and after 4 seconds (bottom right).
Figure 22:
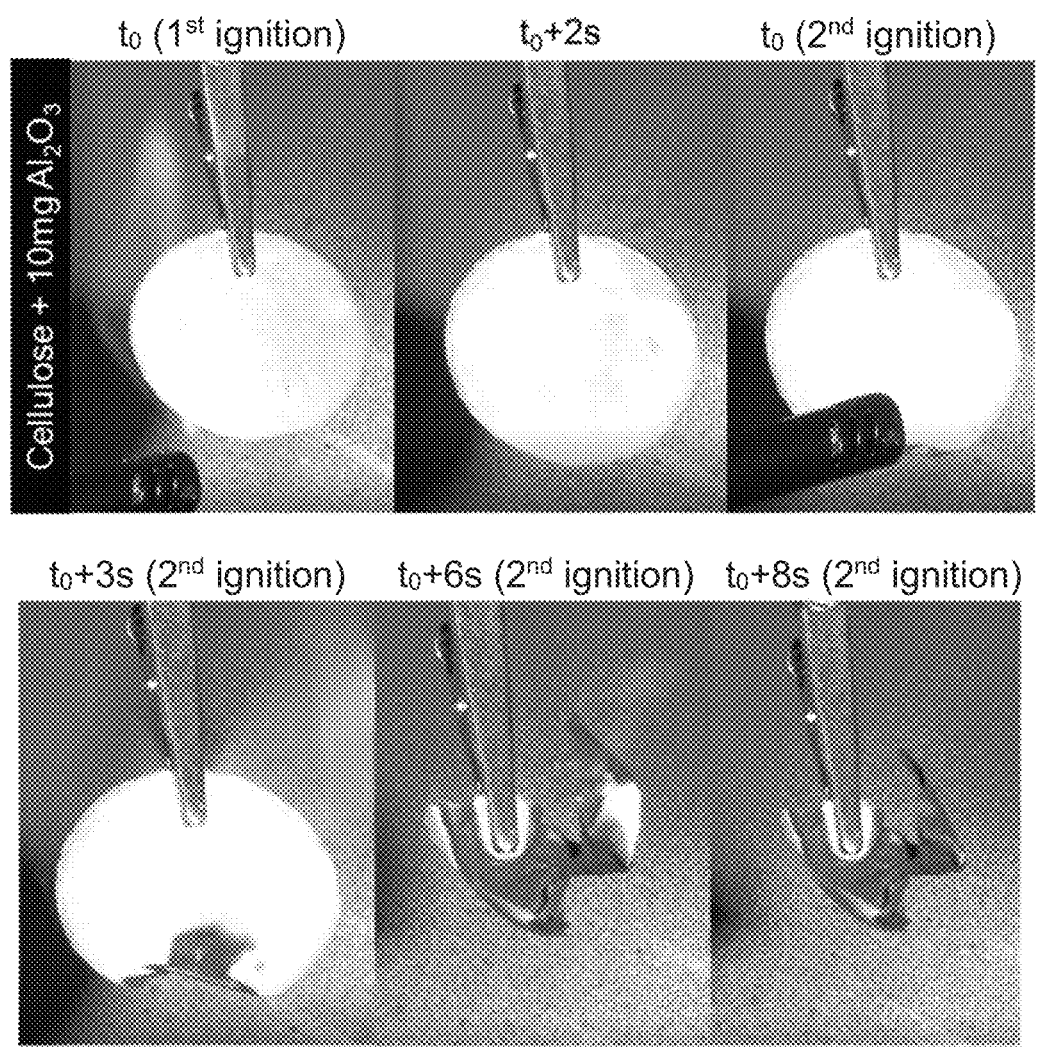
FIG. 22 shows photographs of a cellulose separator with $Al_2O_3$ at first ignition (top left), after 2 seconds (top center), at second ignition (top right), after 3 seconds (bottom left), after 6 seconds (bottom center), and after 8 seconds (bottom right).
Figure 23:
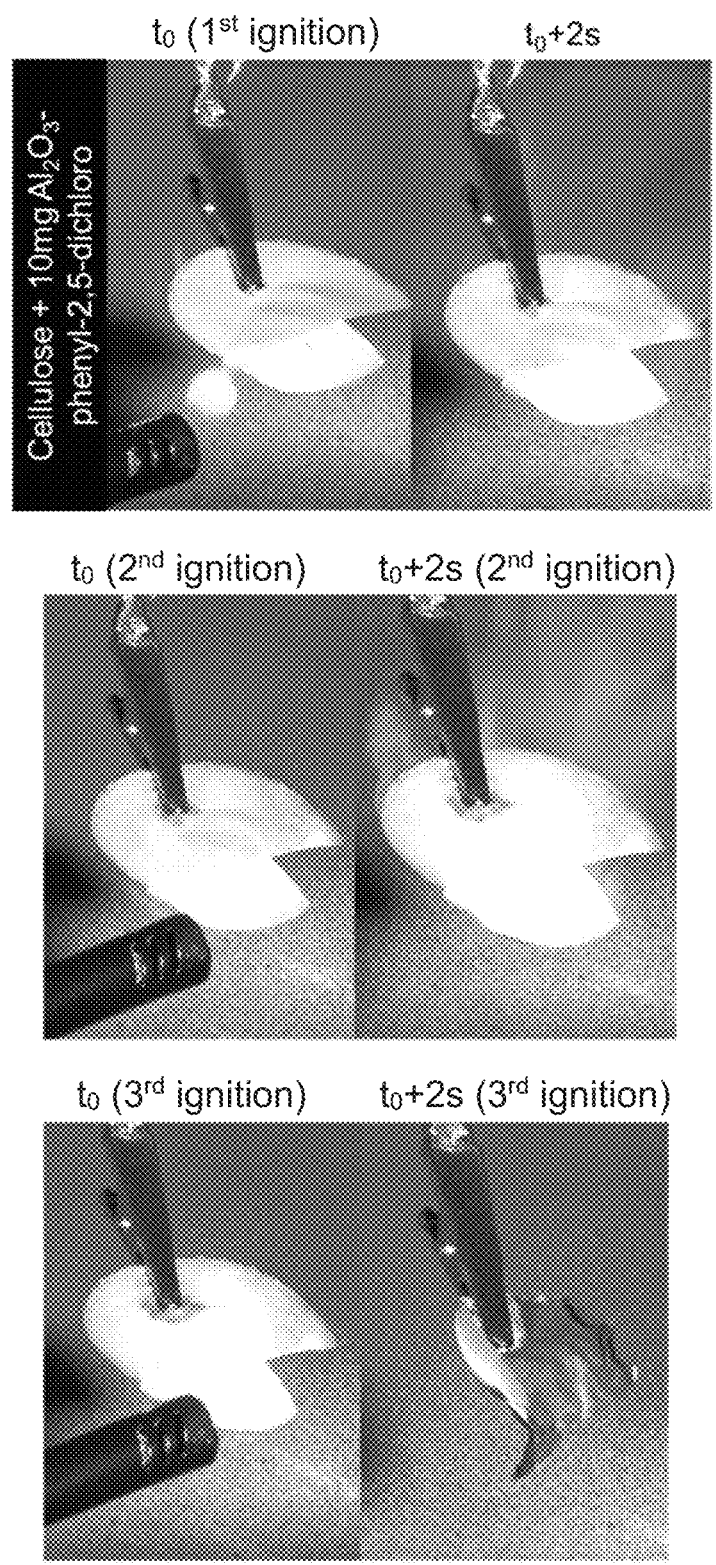
FIG. 23 shows photographs of a cellulose separator with $Al_2O_3$-phenyl-2,5-dichloro at first ignition (top left), after 2 seconds (top right), at second ignition (middle left), after 2 seconds (middle right), at third ignition (bottom left), and after 2 seconds (bottom right).
Figure 24:
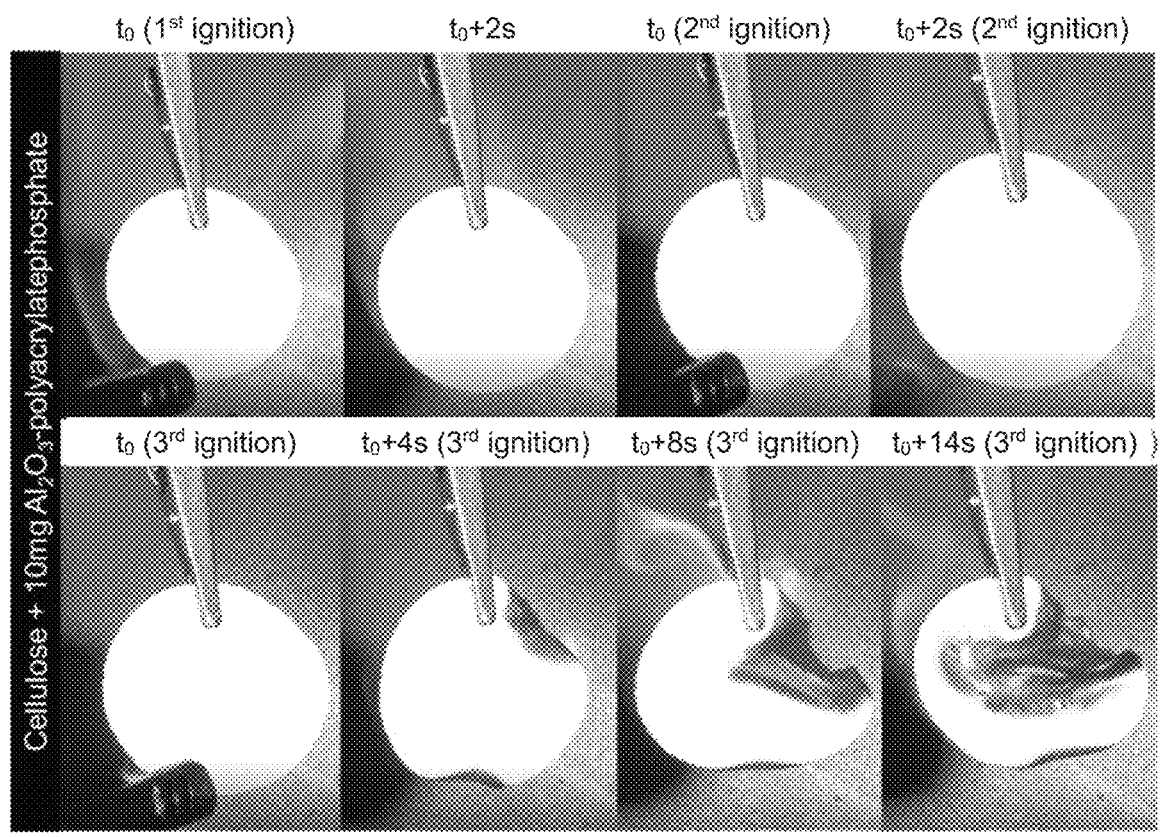
FIG. 24 shows photographs of a cellulose separator with $Al_2O_3$-polyacrylatephosphate at first ignition (top left), after 2 seconds (top, $2^{nd}$ image), at second ignition (top, $3^{rd}$ image), after 2 seconds (top right), at third ignition (bottom left), after 4 seconds (bottom, $2^{nd}$ image), after 8 seconds (bottom $3^{rd}$ image), and after 14 seconds (bottom right).
Figure 25:
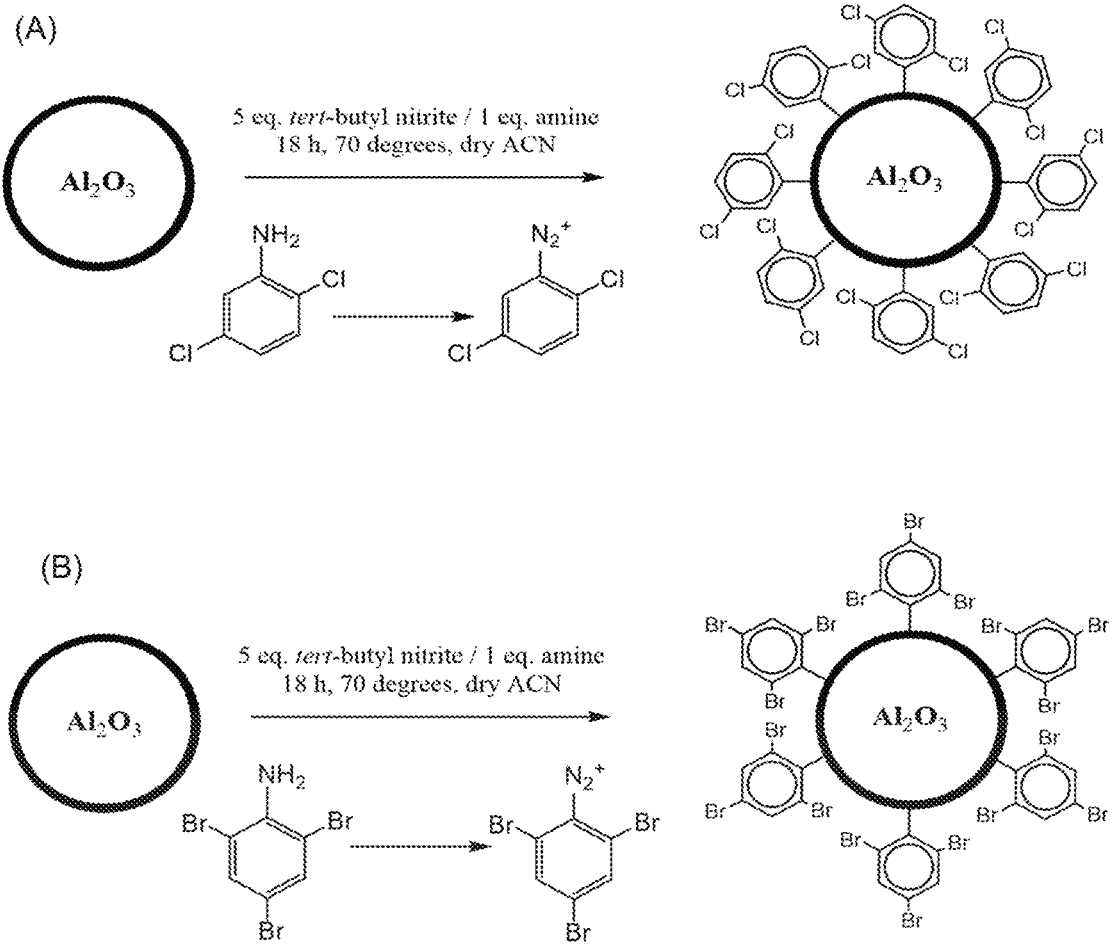
FIG. 25 illustrates the procedure used for the grafting (A) of 2,5-dichlorophenyl groups on $Al_2O_3$; and (B) of 2,4,6-tribromophenyl on $Al_2O_3$ particles according to Example 2 (a).
Figure 26:
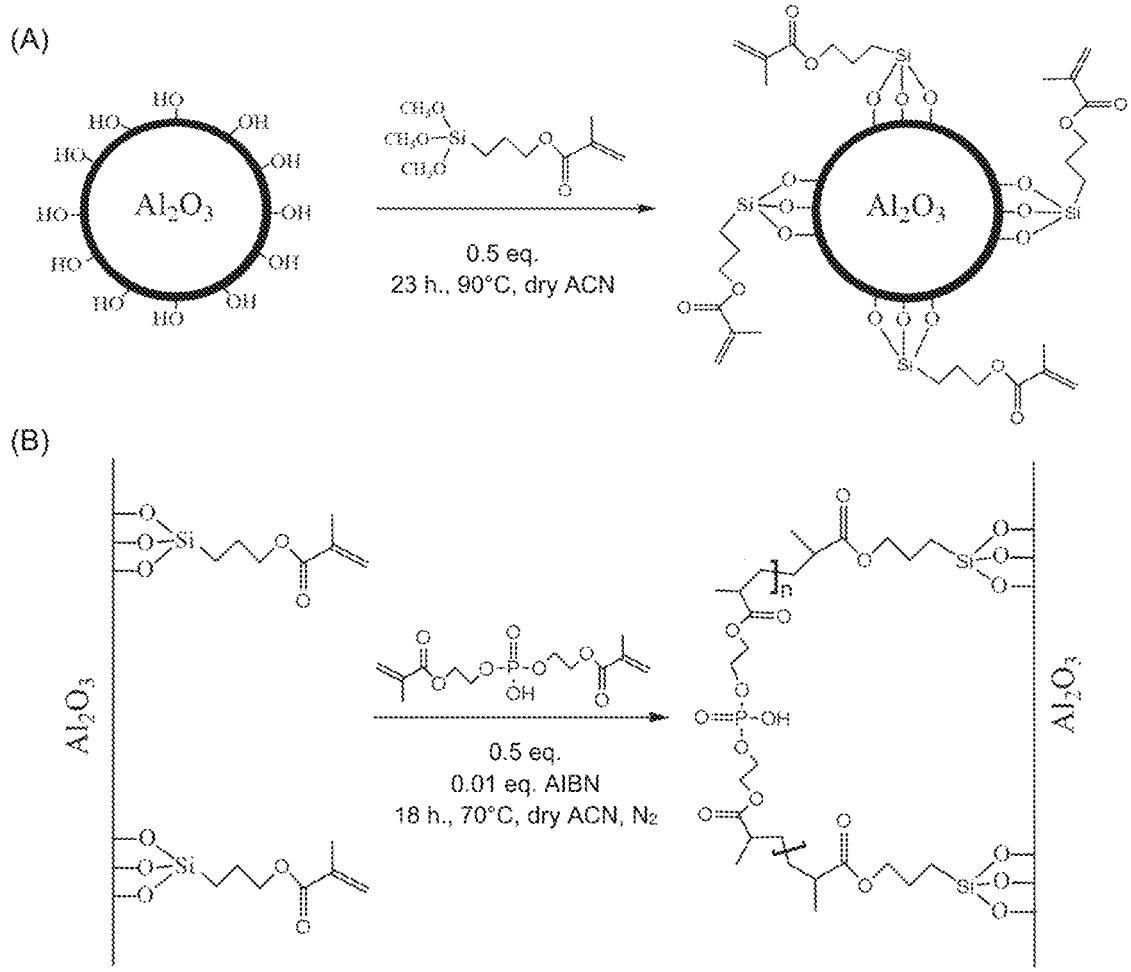
FIG. 26 illustrates schematically the procedures used for (A) the grafting of methacrylate reactive functions of the surface of $Al_2O_3$ by reaction with functionalized silanes; and (B) the polymerization of a phosphate-containing molecule according to Example 2 (b).

NMC/graphite batteries were also assembled with the cellulose separators containing modified and unmodified Al$_2$O$_3$ ceramic. Long cycling and charge/discharge curves are shown in FIG. 17. When using the separators with Al$_2$O$_3$, it is noticed that the specific capacity is more stable during the cycling compared to the battery assembled with the commercial Celgard®-3501 separator. Secondly, compared to what was observed for the cycling of FIG. 15, it is noted that the specific capacity increases slightly over the first ten cycles before stabilizing. This phenomenon can be very well observed in FIG. 17(*b*) with the charge/discharge curve for the 1$^{st}$ cycle in C/10 for the battery with the Al$_2$O$_3$-phenyl-2,4,6-tribromo separator. These two observations seem to confirm that the loss of capacity over the 100 cycles is directly related to the separator porosity. Indeed, SEM images of the cellulose separator with the modified ceramic, presented in FIGS. 12 and 13, showed that the agglomerates completely blocked the porosity, which limits access to the electrolyte during the first cycles (activation and progressive gain in capacity) and prevents the dissolution of the active material during cycling (better resistance in cycling). Finally, impedances of batteries assembled with the modified and unmodified Al$_2$O$_3$ ceramic (FIG. 18) show the same behavior over 100 cycles in C/10 as that observed for the batteries in FIG. 16.

Several modifications could be made to any of the above-described embodiments without departing from the scope of the present invention as contemplated. References, patents or scientific literature documents referred to in the present application are incorporated herein by reference in their entirety and for all purposes:

The invention claimed is:

1. A separator for an electrochemical cell comprising cellulose fibers and a flame retardant, the flame retardant comprising an organophosphorus group or a phosphorus-containing polymeric chain wherein the flame retardant is attached to the cellulose fibers by one or more covalent bonds or is fixed on a support by one or more covalent bonds, the support being integrated into the porosity of the cellulose fibers and/or fixed on the cellulose fibers by electrostatic intermolecular interactions and/or by hydrogen bonds, wherein the organophosphorus group or phosphorus-containing polymeric chain is of Formula I, II, III, or IV:

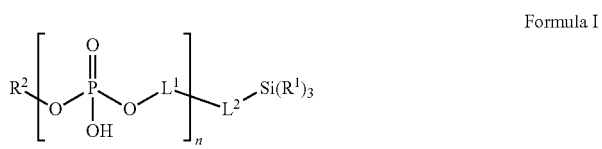

Formula I

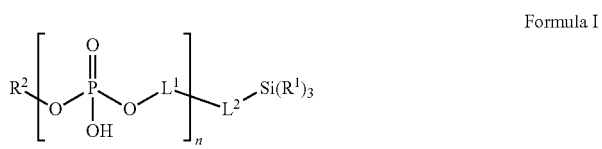

Formula II

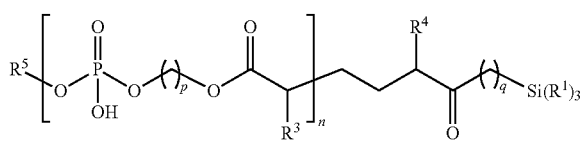

Formula III

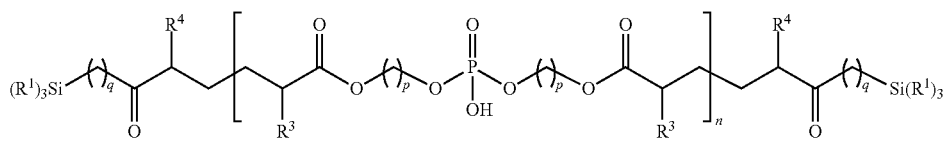

Formula IV wherein
L¹ is, independently at each occurrence, selected from alkylene, alkyleneoxycarbonylalkylene, and alkylenecarbonyloxyalkylene;
L² is selected from an alkylene, alkyleneoxy (linked to the silicon atom by an oxygen atom), oxyalkylene (linked to the silicon atom by a carbon atom), oxyalkyleneoxy, alkyleneoxycarbonylalkylene, alkylenecarbonyloxyalkylene, oxyalkyleneoxycarbonylalkylene, and oxyalkylenecarbonyloxyalkylene;
$R^1$ is, independently at each occurrence, a OH, Cl, $C_{1-6}$alkyl, $OC_{1-6}$alkyl group, or a covalent bond between the silicon atom and the oxygen atom from the support or from the cellulose fiber, and where at least one $R^1$ is such a covalent bond;
$R^2$ is H, $C_{1-6}$alkyle, or a $-L^1-L^2-Si(R^1)_3$ group;
$R^3$ and $R^4$ are, independently at each occurrence, a hydrogen atom or a $C_{1-3}$alkyl group;
$R^5$ is H, $C_{1-6}$alkyl, or a $-(CH_2)_pOC(O)CH(R^3)CH_2CH_2CH(R^4)(CH_2)_q-Si(R^1)_3$ group;
n is an integer selected from the numbers from 1 to 2000;
p is an integer independently at each occurrence selected from the numbers 2 to 4; and
q is an integer independently at each occurrence selected from the numbers 1 to 4.

2. The separator of claim 1, wherein the cellulose is natural.

3. The separator of claim 1, wherein the cellulose is a modified cellulose.

4. The separator of claim 1, wherein the average size of the cellulose fibers is between 5 nm and 5 mm.

5. The separator of claim 1, wherein the flame retardant is fixed on a support by one or more covalent bonds, the support being in the form of particles formed from an electrochemically inert and electronically non-conductive material.

6. The separator of claim 5, wherein the electrochemically inert material is selected from an inorganic compound.

7. The separator of claim 1, wherein the alkylene included in the $L^1$ alkylene, alkyleneoxycarbonylalkylene, or alkylenecarbonyloxyalkylene groups comprises from 1 to 4 carbon atoms; and/or $L^2$ alkylene, alkyleneoxy, oxyalkylene, oxyalkyleneoxy, alkyleneoxycarbonylalkylene, alkylenecarbonyloxyalkylene, oxyalkyleneoxycarbonylalkylene, or oxyalkylenecarbonyloxyalkylene groups comprises from 1 to 4 carbon atoms.

8. The separator of claim 1, wherein $R^3$ is a hydrogen or a methyl, and/or $R^4$ is a hydrogen or a methyl.

9. The separator of claim 1, wherein $R^1$ is a covalent bond between the silicon atom and the oxygen atom of the support in at least one occurrence.

10. A separator-electrolyte component comprising a separator as defined in claim 1 and an electrolyte comprising at least one element selected from a salt, a polar, aprotic and non-aqueous solvent, an ionic liquid, and a polymer.

11. The separator-electrolyte component of claim 10, comprising a polar, aprotic and non-aqueous solvent.

12. The separator-electrolyte component of claim 10, comprising a salt of an alkali or alkaline earth metal.

13. The separator-electrolyte component of claim 10, comprising a polymer.

14. The separator-electrolyte component of claim 10, comprising an ionic liquid.

15. An electrochemical cell comprising a negative electrode, a positive electrode, an electrolyte and a separator as defined in claim 1.

16. An electrochemical cell comprising a negative electrode, a positive electrode, and a separator-electrolyte component as defined in claim 10.

17. The electrochemical cell according to claim 15, wherein the positive electrode comprises a positive electrode electrochemically active material, optionally a binder, and optionally an electronically conductive material.

18. The electrochemical cell according to claim 15, wherein the negative electrode comprises a negative electrode electrochemically active material, the negative electrode electrochemically active material being selected from alkali and alkaline earth metals, and alloys comprising two or more of the alkali and alkaline earth metals, graphite and other carbon sources, metal oxides, lithiated metal oxides, and organic anode materials.

19. An electrochemical accumulator comprising at least one electrochemical cell as defined in claim 15.

20. A material comprising a flame retardant covalently fixed on a support, the support being in the form of particles, wherein the flame retardant is an organophosphorus group or a phosphorus-containing polymeric chain, and wherein the organophosphorus group or phosphorus-containing polymeric chain is of Formula I, II, III, or IV:

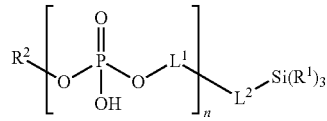

Formula I

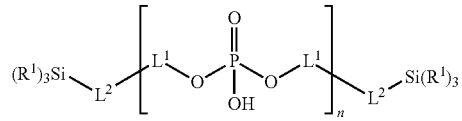

Formula II

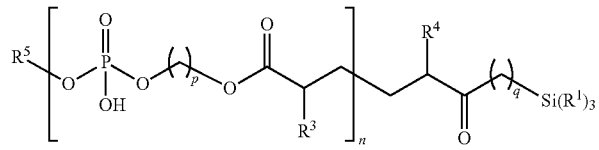

Formula III

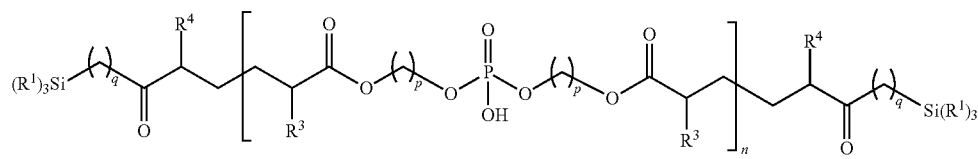

Formula (IV)

wherein
- $L^1$ is, independently at each occurrence, selected from alkylene, alkyleneoxycarbonylalkylene, and alkylenecarbonyloxyalkylene;
- $L^2$ is selected from an alkylene, alkyleneoxy (linked to the silicon atom by an oxygen atom), oxyalkylene (linked to the silicon atom by a carbon atom), oxyalkyleneoxy, alkyleneoxycarbonylalkylene, alkylenecarbonyloxyalkylene, oxyalkyleneoxycarbonylalkylene, and oxyalkylenecarbonyloxyalkylene;
- $R^1$ is, independently at each occurrence, a OH, Cl, $C_{1-6}$alkyl, $OC_{1-6}$alkyl group, or a covalent bond between the silicon atom and the oxygen atom from the support, and where at least one $R^1$ is such a covalent bond;
- $R^2$ is H, $C_{1-6}$alkyle, or a $-L^1-L^2-Si(R^1)_3$ group;
- $R^3$ and $R^4$ are, independently at each occurrence, a hydrogen atom or a $C_{1-3}$alkyl group;
- $R^5$ is H, $C_{1-6}$alkyl, or a $-(CH_2)_pOC(O)CH(R^3)CH_2CH_2CH(R^4)(CH_2)_q-Si(R^1)_3$ group;
- n is an integer selected from the numbers from 1 to 2000;
- p is an integer independently at each occurrence selected from the numbers 2 to 4; and
- q is an integer independently at each occurrence selected from the numbers 1 to 4.

21. The material of claim 20, wherein the electrochemically inert material is-selected from an inorganic compound, a ceramic, and a polymer.

22. The material of claim 20, wherein the alkylene included in the $L^1$ alkylene, alkyleneoxycarbonylalkylene, or alkylenecarbonyloxyalkylene groups comprises from 1 to 4 carbon atoms; and/or the alkylene included in the $L^2$ alkylene, alkyleneoxy, oxyalkylene, oxyalkyleneoxy, alkyleneoxycarbonylalkylene, alkylenecarbonyloxyalkylene, oxyalkyleneoxycarbonylalkylene, or oxyalkylenecarbonyloxyalkylene groups comprises from 1 to 4 carbon atoms.

23. The material of claim 20, wherein $R^3$ is a hydrogen or a methyl; and/or $R^4$ is a hydrogen or a methyl.

24. The material of claim 20, wherein $R^1$ is a covalent bond between the silicon atom and the oxygen atom of the support in at least one occurrence.

25. The separator of claim 1, wherein the average size of the cellulose fibers is between 750 μm and 2.5 mm.

26. The separator of claim 3, wherein said modified cellulose comprises hydrophilic groups or hydrophobic groups.

27. The separator of claim 5, wherein the electrochemically inert material is an ionic conductor.

28. The separator of claim 6, wherein the inorganic compound is a metallic or non-metallic oxide or a ceramic.

29. The separator of claim 6, wherein the electrochemically inert material comprises an inorganic compound selected from $Al_2O_3$, $ZrO_2$, $Cr_2O_3$, $TiO_2$, $CeO_2$, $Fe_2O_3$, $B_2O$, and $SiO_2$.

30. The separator-electrolyte component of claim 12, wherein the salt of an alkali or alkaline earth metal is a lithium salt.

31. The electrochemical accumulator of claim 15, said electrochemical accumulator being selected from a lithium battery, a sodium battery, a potassium battery, and a lithium-ion battery.

32. The material of claim 20, wherein the particles are formed from an electrochemically inert and electronically non-conductive material.

33. The material of claim 32, wherein the electrochemically inert material is an ionic conductor.

34. The material of claim 20, wherein n is an integer selected from the numbers from 1 to 500.

35. The material of claim 34, wherein n is an integer selected from the numbers from 1 to 50.

36. The material of claim 20, wherein p is an integer independently at each occurrence selected from the numbers 2 and 3.

37. The material of claim 20, wherein q is an integer independently at each occurrence selected from the numbers 2 to 4.

38. The material of claim 21, wherein the electrochemically inert material comprises an inorganic compound.

39. The material of claim 38, wherein the inorganic compound is selected from $Al_2O_3$, $ZrO_2$, $Cr_2O_3$, $TiO_2$, $CeO_2$, $Fe_2O_3$, $B_2O$, and $SiO_2$.

40. The material of claim 22, wherein the alkylene included in the $L^1$ alkylene, alkyleneoxycarbonylalkylene, or alkylenecarbonyloxyalkylene groups comprises from 2 to 4 carbon atoms; and/or $L^2$ alkylene, alkyleneoxy, oxyalkylene, oxyalkyleneoxy, alkyleneoxycarbonylalkylene, alkylenecarbonyloxyalkylene, oxyalkyleneoxycarbonylalkylene, or oxyalkylenecarbonyloxyalkylene groups comprises from 2 to 4 carbon atoms.

41. The material of claim 23, wherein $R^3$ is methyl, and/or $R^4$ is a methyl.

42. The material of claim 24, wherein $R^1$ is a covalent bond with the support in at least three occurrences.

43. The material of claim 24, wherein $R^1$ is a covalent bond with the support at each occurrence.

* * * * *